United States Patent
Jeon et al.

(10) Patent No.: US 10,212,609 B2
(45) Date of Patent: Feb. 19, 2019

(54) METHOD AND APPARATUS FOR CONSTRUCTING MULTI-CELL NETWORK IN MOBILE COMMUNICATION SYSTEM

(71) Applicant: Samsung Electronics Co., Ltd., Suwon-si, Gyeonggi-do (KR)

(72) Inventors: Namryul Jeon, Seoul (KR); Kiback Kim, Seoul (KR); Hanseok Kim, Seoul (KR); Hyojoon Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/546,557

(22) PCT Filed: Jan. 7, 2016

(86) PCT No.: PCT/KR2016/000116
§ 371 (c)(1),
(2) Date: Jul. 26, 2017

(87) PCT Pub. No.: WO2016/122131
PCT Pub. Date: Aug. 4, 2016

(65) Prior Publication Data
US 2017/0374562 A1    Dec. 28, 2017

(30) Foreign Application Priority Data
Jan. 27, 2015  (KR) .................. 10-2015-0012991

(51) Int. Cl.
*H04W 16/24*    (2009.01)
*H04W 24/04*    (2009.01)
(Continued)

(52) U.S. Cl.
CPC .......... *H04W 16/24* (2013.01); *H04W 24/04* (2013.01); *H04W 76/30* (2018.02); *H04W 92/16* (2013.01); *H04W 92/20* (2013.01)

(58) Field of Classification Search
CPC ...... H04W 16/24; H04W 24/04; H04W 92/16
See application file for complete search history.

(56) References Cited

U.S. PATENT DOCUMENTS

2013/0250881 A1* 9/2013 Liao ...................... H04W 36/08
                                                                370/329
2014/0078989 A1    3/2014 Guo et al.
(Continued)

FOREIGN PATENT DOCUMENTS

WO      2014/109580 A2    7/2014

OTHER PUBLICATIONS

NEC; "Introduction of Dual Connectivity"; Nov. 22, 2014; R3-143095, 3GPP TSG-RAN WG3 Meeting #86, San Francisco, USA.

*Primary Examiner* — Chuong A Ngo
(74) *Attorney, Agent, or Firm* — Jefferson IP Law, LLP

(57) ABSTRACT

The present invention relates to a method by which a base station connected to a terminal through a first cell constructs a multi-cell network with another base station supporting a second cell, the method comprising the steps of: setting up a group including the first and second cells with the other base station through a first interface; and negotiating with the other base station through the first interface with respect to a configuration for additionally connecting the second cell to the terminal. However, the present invention is not limited to the example and other examples are possible.

18 Claims, 17 Drawing Sheets

(51) Int. Cl.
    *H04W 92/16* (2009.01)
    *H04W 76/30* (2018.01)
    *H04W 92/20* (2009.01)

(56) References Cited

U.S. PATENT DOCUMENTS

2014/0192738 A1    7/2014   Nam et al.
2014/0192775 A1    7/2014   Li et al.
2014/0335869 A1   11/2014   Choi et al.

\* cited by examiner

METHOD AND APPARATUS FOR CONSTRUCTING MULTI-CELL NETWORK IN MOBILE COMMUNICATION SYSTEM

CROSS-REFERENCE TO RELATED APPLICATION(S)

This application is a U.S. National Stage application under 35 U.S.C. § 371 of an International application filed on Jan. 7, 2016 and assigned application number PCT/KR2016/000116, which claimed the benefit of a Korean patent application filed on Jan. 27, 2015 in the Korean Intellectual Property Office and assigned Serial number 10-2015-0012991, the entire disclosure of which is hereby incorporated by reference.

TECHNICAL FIELD

The present invention relates to a mobile communication system and, more particularly, to a method and apparatus for constructing a multi-cell network in a terminal.

BACKGROUND ART

In general, a mobile communication system has been developed with the purpose of providing communication while securing the mobility of a user. Such a mobile communication system has come to a stage capable of providing high-speed data communication service in addition to voice communication with the help of the rapid progress of the technology.

Recently, as one of next-generation mobile communication systems, a standardization task for a long term evolution (LTE) system is in progress in the 3rd generation partnership project (3GPP). The LTE system is a technology for implementing high-speed packet-based communication having a transfer rate of a maximum of about 100 Mbps higher than a current data transfer rate, and the standardization of the LTE system has almost been completed.

Recently, a discussion about an advanced LTE communication system (LTE-advanced, LTE-A) which enhances the transfer rate by grafting several new technologies into the LTE communication system is being regularized. A representative one of the technologies to be newly introduced may be a carrier aggregation. Unlike in a conventional technology in which a terminal sends and receives data using only one forward carrier and one backward carrier, in the carrier aggregation, one terminal uses a plurality of forward carriers and a plurality of backward carriers.

Today, in LTE-A, only an intra-eNB carrier aggregation has been defined. In the case of the intra-eNB carrier aggregation, it is apprehended that if one eNB is incapable of service due to an obstacle or load, a terminal in a corresponding area may not be provided with a communication service. Accordingly, there is a need for the definition of the inter-eNB carrier aggregation.

DISCLOSURE OF INVENTION

Technical Problem

Various embodiments of the present invention have been made in order to solve at least some of the above problems, and an object of the present invention is to provide a method and apparatus for constructing a multi-cell network environment by overlapping cells between eNBs which serve different frequencies.

Solution to Problem

A method for a base station to construct a multi-cell network according to an embodiment of the present invention relates to a method for a base station connected to a user equipment through a first cell to construct a multi-cell network with a different base station supporting a second cell, and may include the steps of setting up a group including the first and the second cells with the different base station through a first interface; and negotiating a configuration for additionally connecting the second cell to the user equipment with the different base station through the first interface.

A base station according to an embodiment of the present invention is connected to a user equipment through a first cell, and may include a transceiver sending and receiving signals and data; and a controller performing control so that a group including first and second cells is set up with a different base station supporting the second cell through a first interface and a configuration for additionally connecting the second cell to the user equipment is negotiated with the different base station through the first interface.

A method for a base station to construct a multi-cell network according to an embodiment of the present invention relates to a method for a base station supporting a second cell to construct a multi-cell network with a different base station connected to a user equipment through a first cell, and may include the steps of setting up a group including the first and the second cells with the different base station through a first interface; and negotiating a configuration for additionally connecting the second cell to the user equipment with the different base station through the first interface.

A base station according to an embodiment of the present invention supports a second cell, and may include a transceiver sending and receiving signals and data; and a controller performing control so that a group including first and second cells is set up with a different base station connected to a user equipment through the first cell through a first interface and a configuration for additionally connecting the second cell to the user equipment is negotiated with the different base station through the first interface.

A method for a user equipment to construct a multi-cell network according to an embodiment of the present invention relates to a method for a user equipment to construct a multi-cell network with first and the second base stations supporting first and second cells, respectively, and may include the steps of connecting the first cell of the first base station; and receiving a configuration message for additionally connecting the second cell from the first base station when the first and the second base stations negotiate a configuration for additionally connecting the second cell after a group including the first and the second cells is set up through a first interface connecting the first and the second base stations.

A user equipment according to an embodiment of the present invention may include a transceiver sending and receiving signals and data; and a controller performing control so that after a group including first and second cells is set up through a first interface connecting a first cell of a first base station and connecting the first and the second base stations, when the first and the second base stations negotiate a configuration for additionally connecting the second cell, a configuration message for additionally connecting the second cell is received from the first base station.

Advantageous Effects of Invention

In accordance with various embodiments of the present invention, since a multi-cell network is provided by overlapping cells between BSs which serve different frequencies, although an obstacle is generated in one specific BS, MSs supporting multiple frequencies can avoid the break of a communication service by using a frequency served by another BS. Accordingly, a more stabilized communication service can be managed compared to an intra-eNB carrier aggregation.

MODE FOR THE INVENTION

Figure 1:
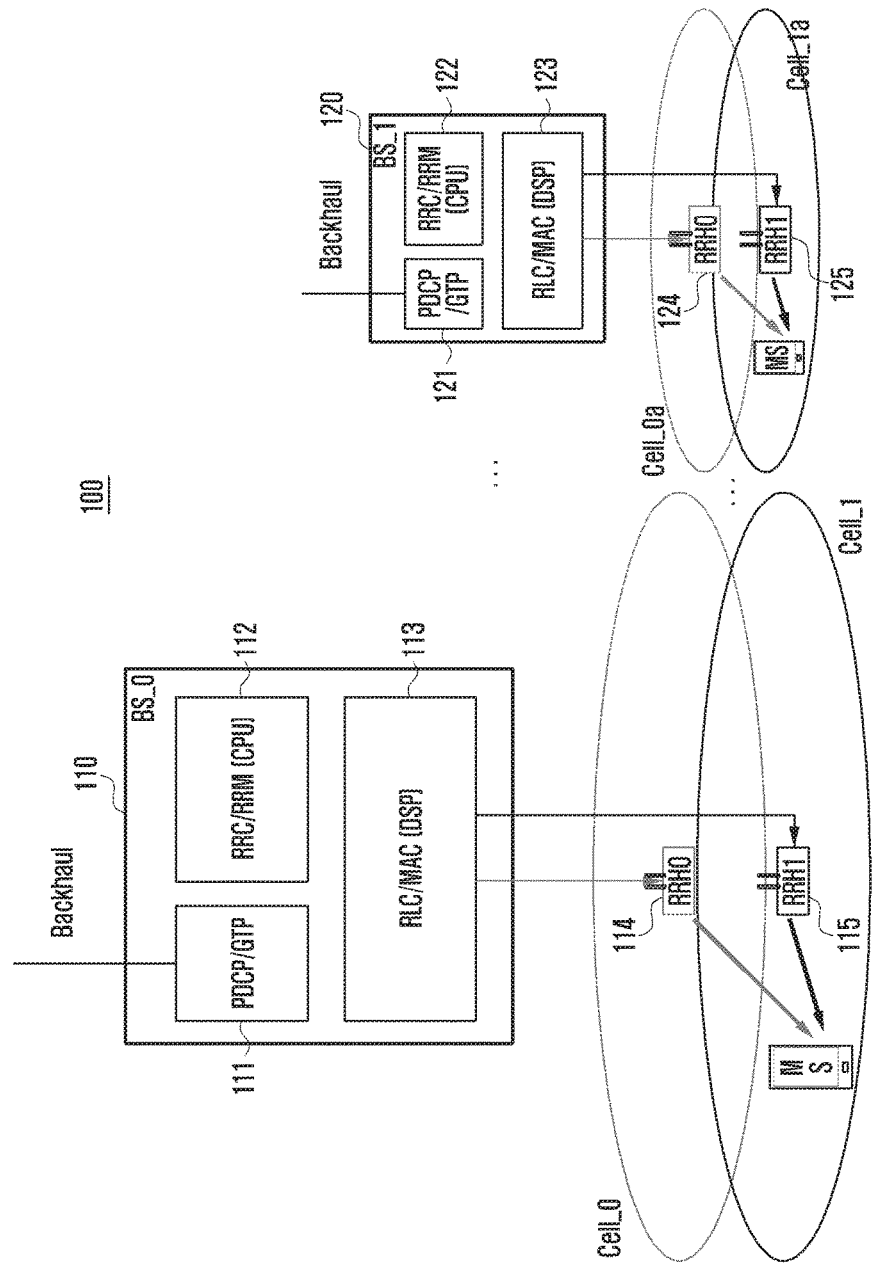
FIG. 1 is a diagram showing an intra-eNB carrier aggregation.

Hereinafter, preferred embodiments of the present invention are described in detail with reference to the accompanying drawings. It is to be noted that the same reference numbers are used throughout the drawings to refer to the same elements. Furthermore, a detailed description of known functions or constructions that may make the gist of the present invention vague is omitted.

Furthermore, in describing the embodiments of the present invention in detail, an advanced E-UTRA (or called LTE-A) system supporting a carrier aggregation will be a major subject, but the major gist of the present invention may be slightly modified within the range that does not greatly depart from the scope of the present invention and applied to other communication systems having a similar technological background and channel form. This may be possible based on a determination of those skilled in the art of the present invention. For example, the major gist of the present invention may also be applied to multicarrier HSPA that supports a carrier aggregation.

The embodiments of the present invention disclosed in the present specification and drawings are illustrated to present only specific examples in order to clarify the technological contents of the present invention and help understanding of the present invention, but are not intended to limit the scope of the present invention. It will be evident to those skilled in the art that various implementations based on the technological spirit of the present invention are possible in addition to the disclosed embodiments.

Various embodiments of the present invention relate to an interface configuration for realizing a frequency aggregation technology between a plurality of base stations (BSs) and information exchanged therefor, and a call processing procedure of a cell unit and terminal (UE) unit for the exchange of the information in a mobile communication system supporting a carrier aggregation (hereinafter CA) technology. The CA technology is a technology for enhancing a data transfer rate for each UE in such a manner that a UE and a BS simultaneously send and receive data through two or more carrier frequencies. In order to use the CA technology, the following functions may be provided on the BS side and the UE side.

(1-1) the UE side: a function of simultaneously receiving data from a plurality of frequencies.

/the BS side: a function for simultaneous transmission to a plurality of frequencies supported by the UE side.

(1-2) the UE side: a function of simultaneously receiving and sending data to and from a plurality of frequencies.

/the BS side: a function for simultaneous transmission and reception to and from a plurality of frequencies supported by the UE side.

In this case, the BS supporting a CA may operate as follows.

(2-1) can provide a UE not supporting a CA with a service through a single frequency and single cell.

(2-2) can provide a service for simultaneously sending and receiving data to a UE supporting a CA through a plurality of cells having different carrier frequencies (that is, the UE supporting a CA may have a plurality of serving cells).

(2-3) A UE is capable of a radio link control (RRC) connection by performing an access attempt on one of a plurality of cells capable of simultaneous service (one cell that belongs to serving cells and that maintains an RRC connection with a UE is called a primary cell (PCell), and cells additionally used for data transmission and reception without an RRC connection are called secondary cells (SCells)).

FIG. 1 is a diagram showing a mobile communication system 100 for representing an intra-eNB CA.

Referring to FIG. 1, the intra-eNB CA may have a structure in which overlapped cells from one BS serve the same area. For example, a first BS (BS_0) 110 may construct a multi-cell environment in a corresponding area through a first antenna (RRH0) 114 and the second antenna (RRH1) 115 supporting different carrier frequencies. The number of antennas for constructing the multi-cell environment is not limited. The BS_0 110 may include a PDCP/GTP layer 111 and an RRC/RRM layer 112 within a CPU, for example, and may include an RLC/MAC layer 113 within an assistant processing device, such as a DSP, for example. However, the present invention is not limited to such a configuration. In the corresponding area, an MS may send and receive data through at least one of a first cell Cell_0 provided by the RRH0 114 and a second cell Cell_1 provided by the RRH1.

In accordance with various embodiments of the present invention, the same CA environment may be constructed in various areas. For example, a second BS (BS_1) 120 located in a different area may construct a multi-cell environment in a corresponding area through a first antenna (RRH0) 124 and a second antenna (RRH1) 125 supporting different carrier frequencies. The BS_1 120 may include a PDCP/GTP layer 121 and an RRC/RRM layer 122 within a CPU, for example, and may include an RLC/MAC layer 123 within an assistant processing device, such as a DSP, for example. However, the present invention is not limited to such a configuration. In the corresponding area, an MS may send and receive data through at least one of a first cell Cell_0a provided by the RRH0 124 and a second cell Cell_1a provided by the RRH1.

Meanwhile, in an intra-eNB CA, such as FIG. 1, it is apprehended that for example, if any one BS is incapable of service due to an obstacle or load, an MS in a corresponding area may never receive a communication service if the electric fields of neighbor cells do not reach the corresponding area.

Figure 2:
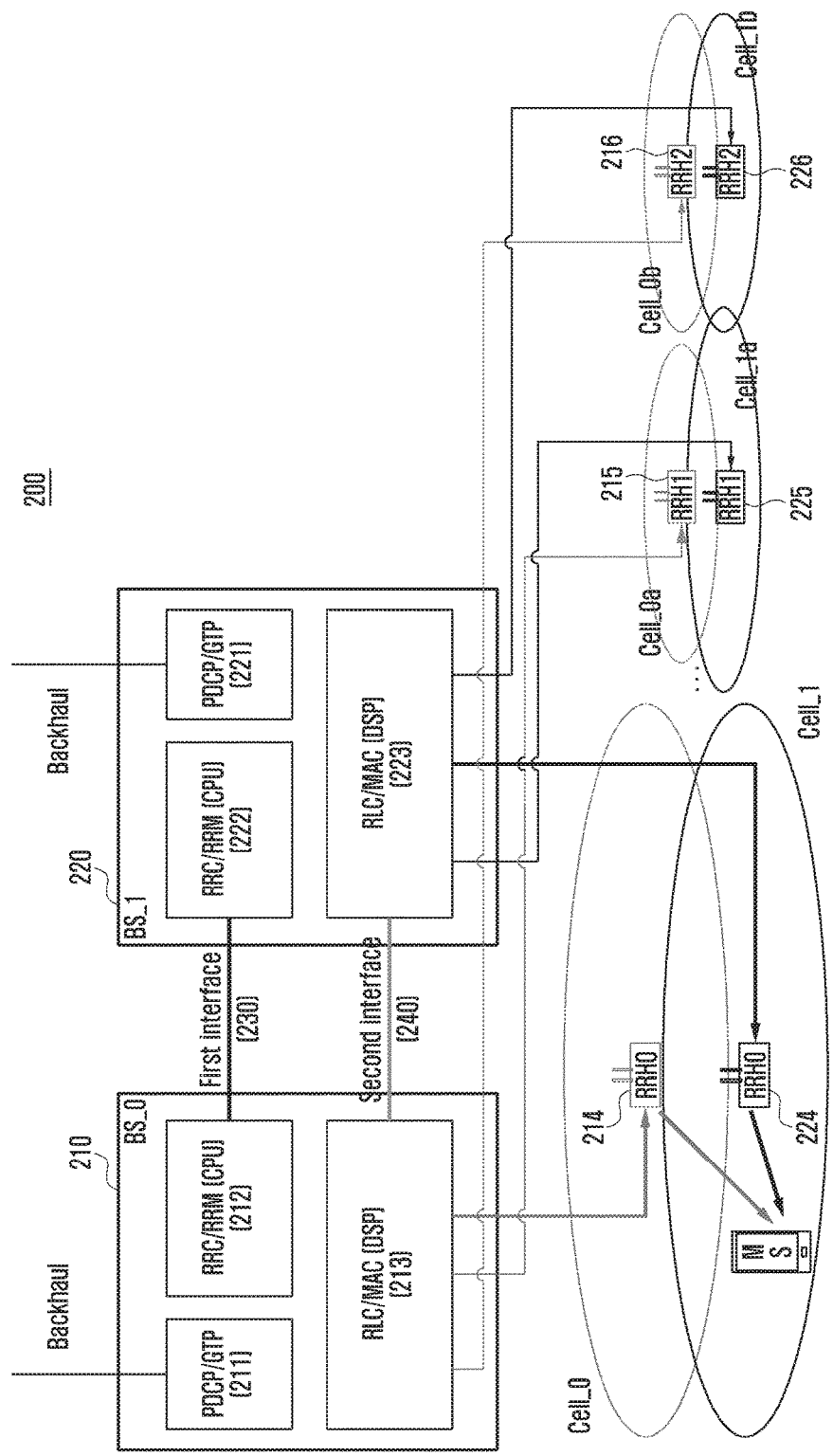
FIG. 2 is a diagram showing an inter-eNB carrier aggregation according to an embodiment of the present invention.

FIG. 2 is a diagram showing a mobile communication system 200 for representing an inter-eNB CA according to an embodiment of the present invention.

Referring to FIG. 2, the mobile communication system 200 according to an embodiment of the present invention may configure a multi-frequency environment in which a BS serving a specific frequency serves a plurality of cells of a specific frequency to various areas and a BS serving a different frequency overlaps a plurality of cells of a different frequency with the plurality of cells of the specific frequency.

For example, a first BS (BS_0) 210 may support a specific carrier frequency for corresponding areas through a first antenna (RRH0) 214, a second antenna (RRH1) 215 and a third antenna (RRH2) 216 distributed and disposed in various areas. The number of antennas that support the specific carrier frequency of the BS_0 210 is not limited. A second BS (BS_1) 220 may support a different carrier frequency through a first antenna (RRH0) 224, a second antenna (RRH1) 225 and a third antenna (RRH2) 226 by overlapping the different carrier frequency with the areas in which cells provided by the BS_0 210 have been formed. Accordingly, for example, a multi-cell environment in which an MS is capable of sending and receiving data through a first cell Cell_0 and a second cell Cell_1 may be constructed in the areas to which services are provided by the RRH0s 214 and 224 of the BS_0 and the BS_1 Furthermore, a multi-cell environment in which an MS is capable of sending and receiving data through a first cell Cell_1a and a second cell Cell_1a may be constructed in the areas to which services are provided by the RRH1s 215 and 225 of the BS_0 and the BS_1. A multi-cell environment in which an MS is capable of sending and receiving data through a first cell Cell_0b and a second cell Cell_1b may be constructed in the areas to which services are provided by the RRH2s 215 and 225 of the BS_0 and the BS_1 Accordingly, in accordance with an embodiment of the present invention, a multi-cell environment in which two identical carrier frequencies are supported in various areas can be constructed by two BSs.

In accordance with one embodiment, the BS_0 210 may include a PDCP/GTP layer 211, an RRC/RRM layer 212 and an RLC/MAC layer 213. For example, the BS_0 210 may include the PDCP/GTP layer 211 and the RRC/RRM layer 212 within a CPU and the RLC/MAC layer 213 within an assistant processing device, such as a DSP, for example. The PDCP/GTP layer 211 may store IP packet traffic that has been received from a backhaul and that is to be transmitted to an MS according to it sequence. The RRC/RRM layer 212 may set up a wireless connection with an MS and may have prepared a passage through which control information is exchanged with a lower layer. The RLC/MAC layer 213 may reconfigure a packet and properly distribute resources (frequency/time) provided to a plurality of MSs. A BS_1 220 may also include a PDCP/GTP layer 221, an RRC/RRM layer 222 and an RLC/MAC layer 223. For example, the BS_1 220 may include the PDCP/GTP layer 221 and the RRC/RRM layer 222 within a CPU and the RLC/MAC layer 223 within an assistant processing device, such as a DSP, for example.

In accordance with an embodiment of the present invention, for a CA, a first interface 230 may be connected between the RRC/RRM layers 212 and 222 of the BS_0 210 and the BS_1 220, and a second interface 240 may be connected between the RLC/MAC layers 213 and 223 thereof. The first interface 230 and the second interface 240 may include an embodiment of the exchange of signals through a physical connection. The first interface 230 is an interface between higher layers. Various control messages for a CA configuration may be exchanged through the first interface 230. The second interface 240 is an interface between lower layers. As a result of a CA configuration according to the control message, inter-cell context, such as the exchange of packet data, may be managed through the second interface 240.

For example, the first interface 230 may be used for the transmission and reception of messages for partnership establishment, maintenance and re-establishment between the BSs. Furthermore, upon performing a CA-related processing procedure, that is, an SCell configuration/change/release procedure, the first interface 230 may also be used to deliver MS and cell configuration information to an SCell belonging to another BS.

Furthermore, the second interface 240 is chiefly an ideal backhaul and may be used to deliver an RLC or MAC packet between another BS and a lower layer and may be used for the transmission and reception of signals required for scheduling.

In accordance with an embodiment of the present invention, although an obstacle is generated in one specific BS, for example, the BS_0 210, only one of several frequencies that are being served is impossible from a viewpoint of a corresponding area. Accordingly, the break of a service can be avoided because MSs supporting multiple frequencies are still served through the different frequency of the BS_1 220. Accordingly, in accordance with an embodiment of the present invention, the provision of a mobile communication service can be stably managed compared to an intra-eNB CA configuration.

Figure 3:
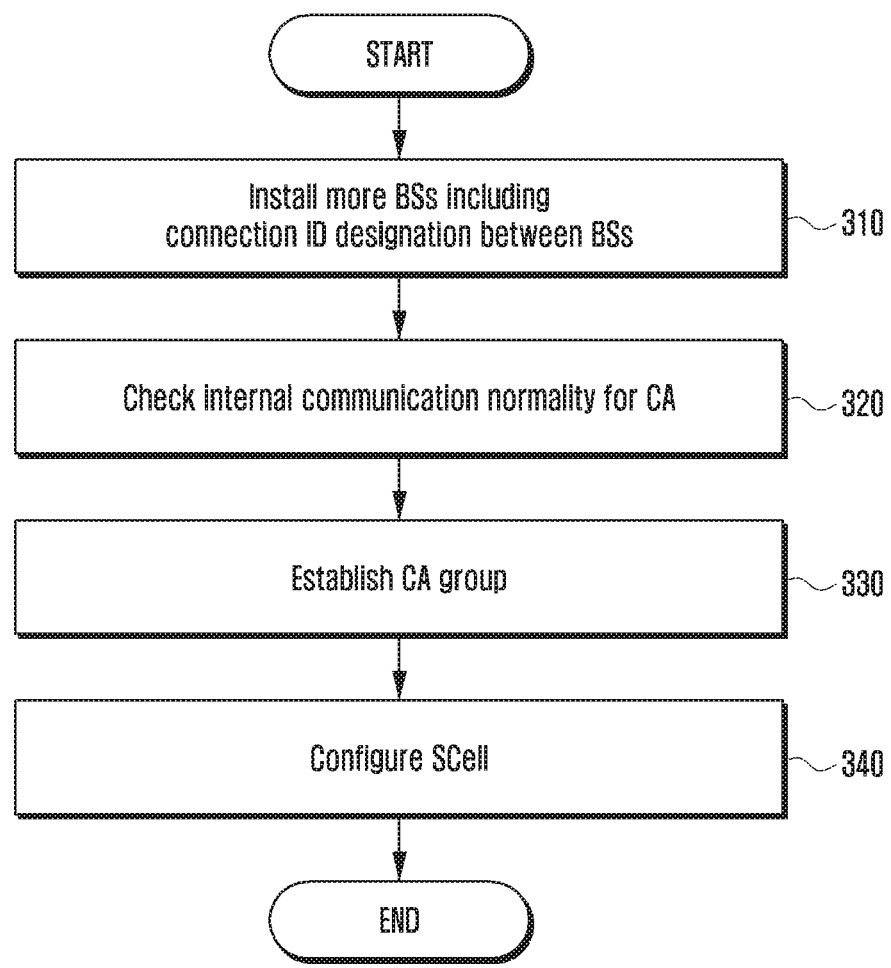
FIG. 3 is a diagram showing a method of constructing a multi-cell network according to an embodiment of the present invention.

FIG. 3 is a diagram showing a method of constructing a multi-cell network according to an embodiment of the present invention.

In accordance with an embodiment of the present invention, in order to make possible a CA between the BS_0 and the BS_1, a multi-cell network may be constructed through a higher layer interface (for example, the first interface 230) between the BS_0 and the BS_1 The present embodiment shows a method of constructing a multi-cell network between the BS_0 and the BS_1 for the SCells of the BS_0 and the BS_1 controlling the PCell of an MS to be subjected to a CA. That is, the present embodiment shows a method for additionally connecting SCells to an MS connected to a PCell.

At step 310, the BS_0 and the BS_1 may complete the extension of more BS including the designation of an inter-BS connection ID. The inter-BS connection ID may include the identifier of each BS for a CA.

At step 320, the BS_0 and the BS_1 may check internal communication normality for an inter-eNB CA. For example, in order to check internal communication normality with the BS_1, the BS_0 may send a keep-alive request message to the BS_1 in a specific cycle and monitor a corresponding response message.

At step 330, the BS_0 and the BS_1 may set up a CA group. In this step, the BS_0 and the BS_1 may share information about each cell for a CA.

At step 340, the BS_0 and the BS_1 may perform an SCell configuration. Such an operation is performed by call processing of an MS unit. For example, the BS_0 may establish a configuration related to an SCell in an MS by sending a configuration message for the SCell of the BS_1 to the MS. The SCell configuration according to various embodiments of the present invention may include SCell addition, release and modification. Furthermore, the SCell configuration may include release according to cell preemption by the triggering of the BS_1.

Table 1 below shows an example of control messages exchanged by the BS_0 and the BS_1 through a higher layer interface according to an embodiment of the present invention.

TABLE 1

| Step | BS_0 message | BS_1 message Success case | BS_1 message Failure case | BS_0 message (commit) |
|---|---|---|---|---|
| Step of checking internal communication normality | Inter-BS Keep-Alive Request | Inter-BS Keep-Alive Response | — | — |
| Step of setting up CA group | CA Group Setup Request | CA Group Setup Response | CA Group Setup Failure | — |
| Step of configuring cell  Addition | SCell Configuration Request | SCell Configuration Response | SCell Configuration Failure | SCell Configuration Commit |
| Release | — | — | — | SCell Configuration Commit |
| Modification | | | | SCell Configuration Commit |
| Release by preemption | — | | | SCell Preemption Indication of BS_1 |

In accordance with an embodiment of the present invention, interfaces may be physically connected and a BS group capable of a CA between the interfaces may be defined as one CA group. A BS may belong to only one CA group, and may maintain and manage information about a maximum of N BSs within the same CA group including its own BS (N is differently given depending on performance/capabilities of a BS). Table 2 below shows CA group parameters and a corresponding management table according to an embodiment of the present invention. In order to exhibit an advantage in terms of the band replication shape, only one BS supporting the same frequency may be configured within one CA group.

TABLE 2

| Inter-eNB connection ID (iNodeID) | BS usage Flag (bscaUsage) | InterfaceAvailable State | Cell Identifier | SCell Usage | PCID | Band | EarfcnDL | ConfigCommon SCell |
|---|---|---|---|---|---|---|---|---|
| BS_0 (Own) | Equip | Enable | 0 | 1 | 317 | 28 | 28 | ... |
| | | | 1 | 1 | 206 | 28 | 28 | ... |
| | | | 2 | 1 | 18 | 28 | 28 | ... |
| | | | 3 | 1 | 277 | 28 | 28 | ... |
| | | | 4 | 1 | 252 | 28 | 28 | ... |
| | | | 5 | 1 | 395 | 28 | 28 | ... |
| | | | 6 | 1 | 495 | 28 | 28 | ... |
| | | | 7 | 1 | 323 | 28 | 28 | ... |

TABLE 2-continued

| Inter-eNB connection ID (iNodeID) | BS usage Flag (bscaUsage) | InterfaceAvailable State | Cell Identifier | SCell Usage | PCID | Band | EarfcnDL | ConfigCommon SCell |
|---|---|---|---|---|---|---|---|---|
| | | | 8 | 1 | 140 | 28 | 28 | ... |
| | | | ... | ... | ... | | | ... |
| | | | ... | ... | ... | | | ... |
| | | | 35 | 0 | D.C | | | ... |
| BS_1 | Equip | Enable | 0 | 1 | 211 | 28 | 28 | ... |
| | | | 1 | 1 | 405 | 28 | 28 | ... |
| | | | 2 | 1 | 234 | 28 | 28 | ... |
| | | | 3 | 1 | 127 | 18 | 18 | ... |
| | | | 4 | 1 | 252 | 18 | 18 | ... |
| | | | 5 | 1 | 220 | 18 | 18 | ... |
| | | | ... | ... | ... | | | ... |
| | | | ... | ... | ... | | | ... |
| | | | 35 | 0 | D.C | | | ... |
| BS_2 | Equip | Enable | 0 | 1 | 314 | 21 | 21 | ... |
| | | | 1 | 1 | 440 | 21 | 21 | ... |
| | | | 2 | 1 | 160 | 21 | 21 | ... |
| | | | 3 | 1 | 400 | 21 | 21 | ... |
| | | | 4 | 1 | 97 | 21 | 21 | ... |
| | | | 5 | 1 | 109 | 21 | 21 | ... |
| | | | 6 | 0 | 381 | 21 | 21 | ... |
| | | | 7 | 0 | 479 | 21 | 21 | ... |
| | | | 8 | 0 | 490 | 21 | 21 | ... |
| | | | ... | ... | ... | | | ... |
| | | | ... | ... | ... | | | ... |
| | | | 35 | 0 | D.C | | | ... |
| BS_3 | Equip | Enable | 0 | 1 | 257 | 1 | 1 | ... |
| | | | 1 | 1 | 260 | 1 | 1 | ... |
| | | | 2 | 1 | 304 | 1 | 1 | ... |
| | | | 3 | 1 | 261 | 1 | 1 | ... |
| | | | 4 | 1 | 157 | 1 | 1 | ... |
| | | | 5 | 1 | 221 | 1 | 1 | ... |
| | | | 6 | 1 | 445 | 1 | 1 | ... |
| | | | 7 | 1 | 19 | 1 | 1 | ... |
| | | | 8 | 1 | 407 | 1 | 1 | ... |
| | | | ... | ... | ... | | | ... |
| | | | ... | ... | ... | | | ... |
| | | | 35 | 0 | D.C | | | ... |
| BS_4 | Not Equip | Disable | — | — | — | | | ... |
| BS_5 | Not Equip | Disable | — | — | — | | | ... |
| BS_6 | Not Equip | Disable | — | — | — | | | ... |
| BS_7 | Not Equip | Disable | — | — | — | | | ... |

* D.C: Don't Care Value

SCell Usage of the parameters described in Table 2 is a flag indicating whether a corresponding cell may become the subject of an SCell in another PCell. Basically, a default value of an operator input is used. If the value is true, upon cell barred/cell release/shutting down or when a corresponding situation is released, a change may be incorporated. Band is a band indicator of a cell having a corresponding cell number (Cell Num). EarfcnDL is an EARFCN indicative of radio frequency downlink channel information of a cell having a corresponding cell number. PCID is a physical cell ID of a cell that may become the subject of an SCell in the PCell of another BS. ConfigCommon SCell indicates common configuration information including dl-Bandwidth, antennaConfigCommon, etc. of a corresponding cell.

Referring to Table 2, each BS has an inter-BS connection ID (iNodeID) of 0 to 7, that is, a key index, in order to identify a BS within the same CA group. A BS usage Flag (bscaUsage) may be set in each inter-BS connection ID as equip or not equip. In this case, a method for an operator to set the BS usage Flag of a BS corresponding to a frequency for a CA to be used as equip is used.

A method of constructing a multi-cell network according to various embodiments of the present invention may basically include (A) a CA group management operation of managing cell information between BSs and cell information between BSs which will perform a CA using a higher layer interface and (B) an individual CA configuration/release/change/modification operation of an MS.

First, in relation to (A) the CA group management operation, the BS_0 may load a parameters set including an inter-BS connection ID as in Table 1 when initially extending a BS. The BS_1 may generate an inter-BS identification IP based on the inter-BS connection ID. For example, the call processing block of the BS_1 may generate the inter-BS identification IP based on the inter-BS connection ID. For example, after initially extending the BS, the BS_1 may derive the IP values of an internal IP communication (IPC, IP communication between internal SW blocks) candidate group of a BS within the same CA group themselves based on the inter-BS connection ID at a point of time prior to service-in. The IP system may be used only in inter-BS SW block communication for a CA independently of an existing shelf ID-based IPC system. That is, the call processing block of the BS_1 may manage a previous IP and two IP systems for inter-BS communication.

Whether the transmission of messages between BSs within a CA group according to an embodiment of the present invention is available may be determined based on the results of keep-alive monitoring in which the state of IPC is incorporated. The call processing block of the BS may autonomously perform keep-alive monitoring in order to determine whether an interface for an inter-eNB CA is available. The CA partnership setup/release/re-setup operation may be performed through a CA group setup procedure. Furthermore, the CA group setup procedure may also be used to deliver a physical cell ID and changed information, such as the availability state of cells under BSs, between BSs in the state in which a partnership has been established.

Figure 4:
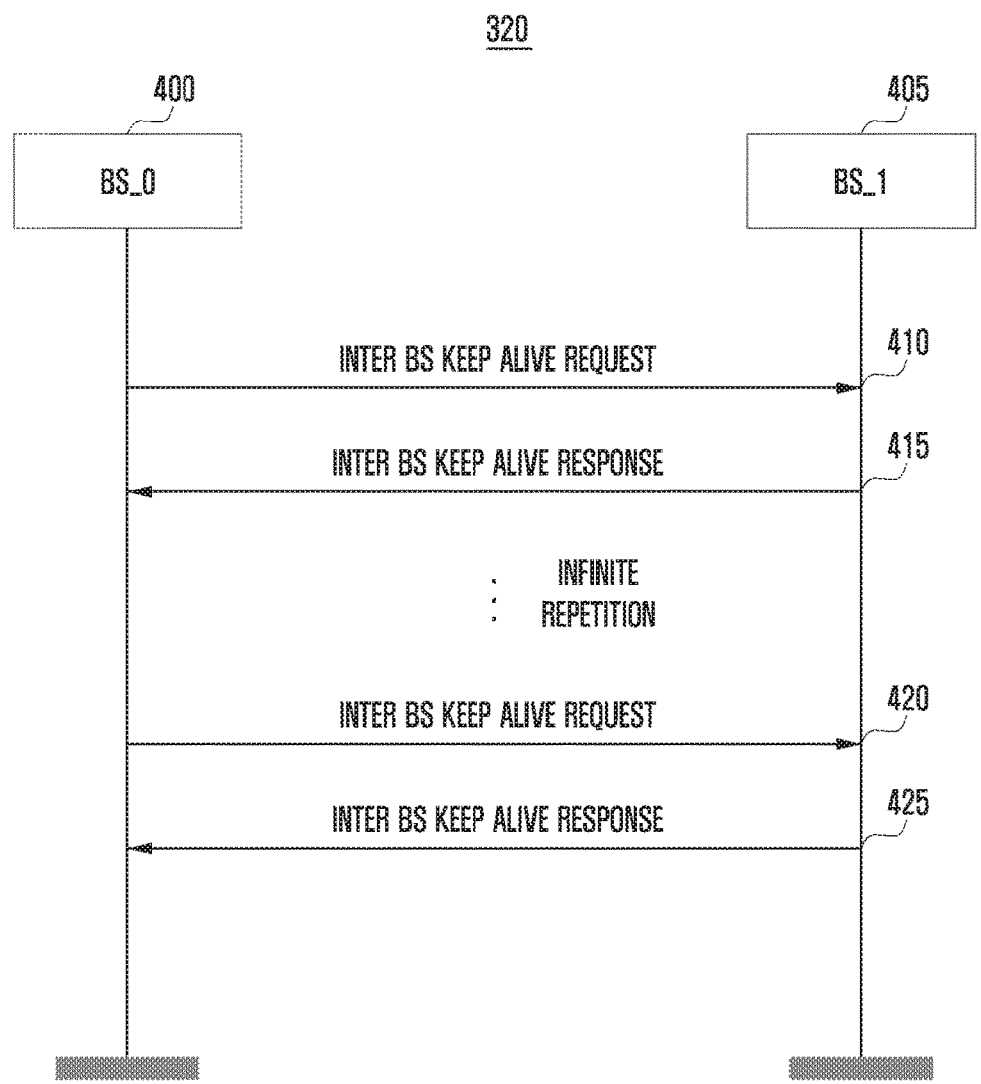
FIG. 4 is a diagram showing a method of checking internal communication normality for an inter-eNB carrier aggregation according to an embodiment of the present invention.

FIG. 4 is a diagram showing a method of checking (320) internal communication normality between BSs through keep-alive monitoring according to an embodiment of the present invention.

The keep-alive monitoring operation between BSs within a CA group according to an embodiment of the present invention may be performed in such a manner that a BS_0 400 sends an Inter-BS Keep-Alive Request message to BSs (for example, a BS_1 405) whose BS usage Flag (bscaUsage) is active at step 410 and the BS_1 405 that has received the request message sends an Inter-BS Keep-Alive Response message in response thereto at step 415. The BS_0 400 may repeatedly send the Inter-BS Keep-Alive Request message at step 420. In response thereto, the BS_1 405 may send the Inter-BS Keep-Alive Response message at step 425.

For example, the BS_0 400 may send the Inter-BS Keep-Alive Request message to the BS_1 405 at specific time intervals from the moment when the following conditions are satisfied.

A. Secure the IP of a call processing SW block within the same CA group

B. A BS completes the preparation of CA support in a shape structure manner

C. The status of the inter-BS connection ID (iNodeID) is 'Equip'

D. The BS usage Flag (bscaUsage) of a counterpart BS is 'Active'

When the Inter-BS Keep-Alive Request message is received from the BS_0 400, if the conditions A to D are satisfied, the call processing block of the BS_1 405 may send the Inter-BS Keep-Alive Response message. If not, if any one of the conditions A to D is not satisfied, the call processing block of the BS_1 405 may ignore the received Inter-BS Keep-Alive Request message.

Figure 5:
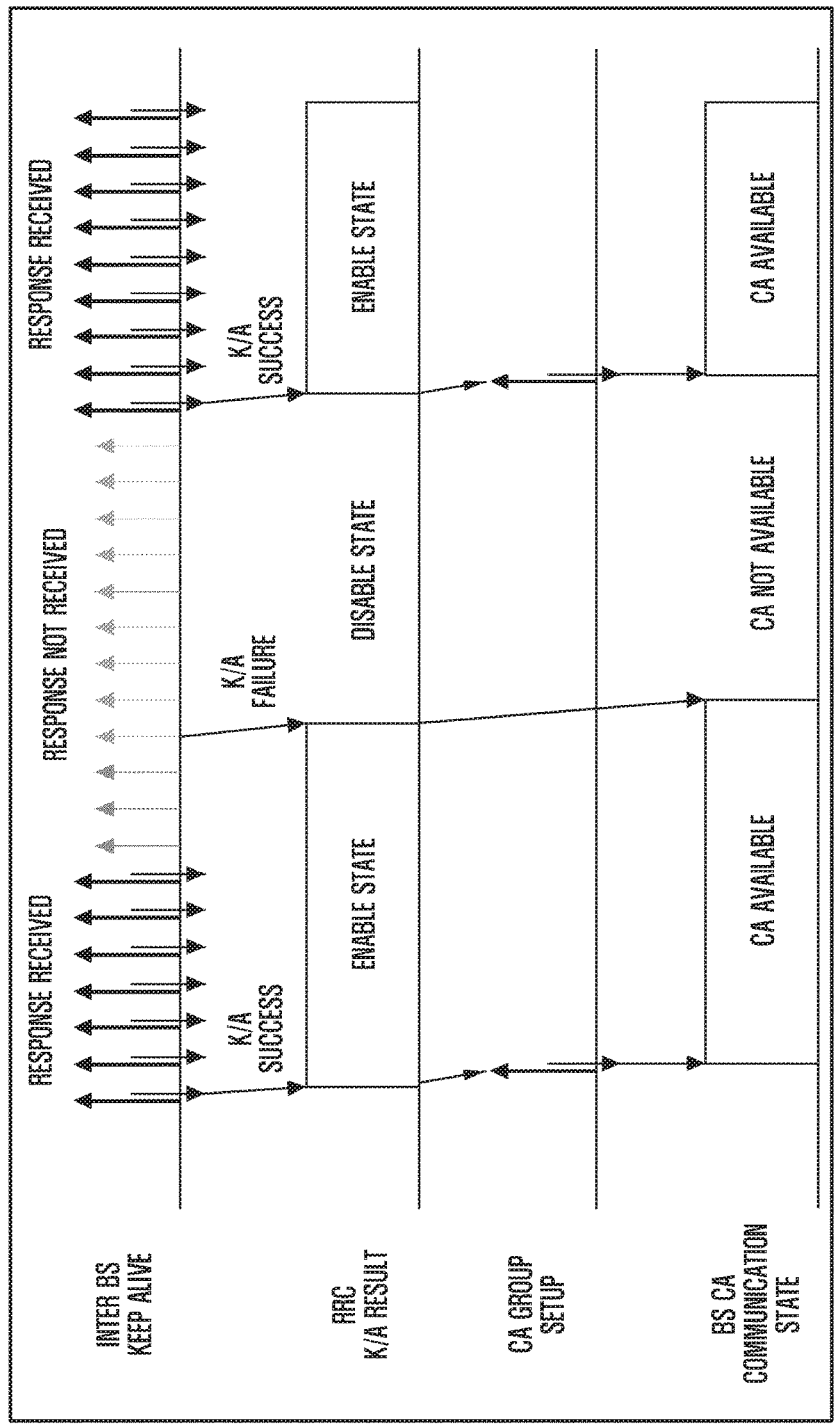
FIG. 5 is a diagram showing the relation between the check of internal communication normality for an inter-eNB carrier aggregation and a point of time at which a carrier aggregation group is set up according to an embodiment of the present invention.

Referring to FIG. 5, a BS (for example, the BS_0 400) may manage the state of a keep-alive monitoring (K/A) result in the Enable or Disable state for each counterpart BS (for example, the BS_1 405) within a CA group. When an Inter-BS Keep-Alive Response message corresponding to an Inter-BS Keep-Alive Request message is received, the state of the K/A result becomes the Enable state. If a specific number of the Inter-BS Keep-Alive Response messages are not continuously received, the state of the K/A result shifts to the Disable state. In accordance with an embodiment of the present invention, if the state of the K/A result is the Enable state, a CA group may be established. In this case, communication for an inter-eNB CA may be available until the K/A result shifts to the Disable state.

Figure 6:
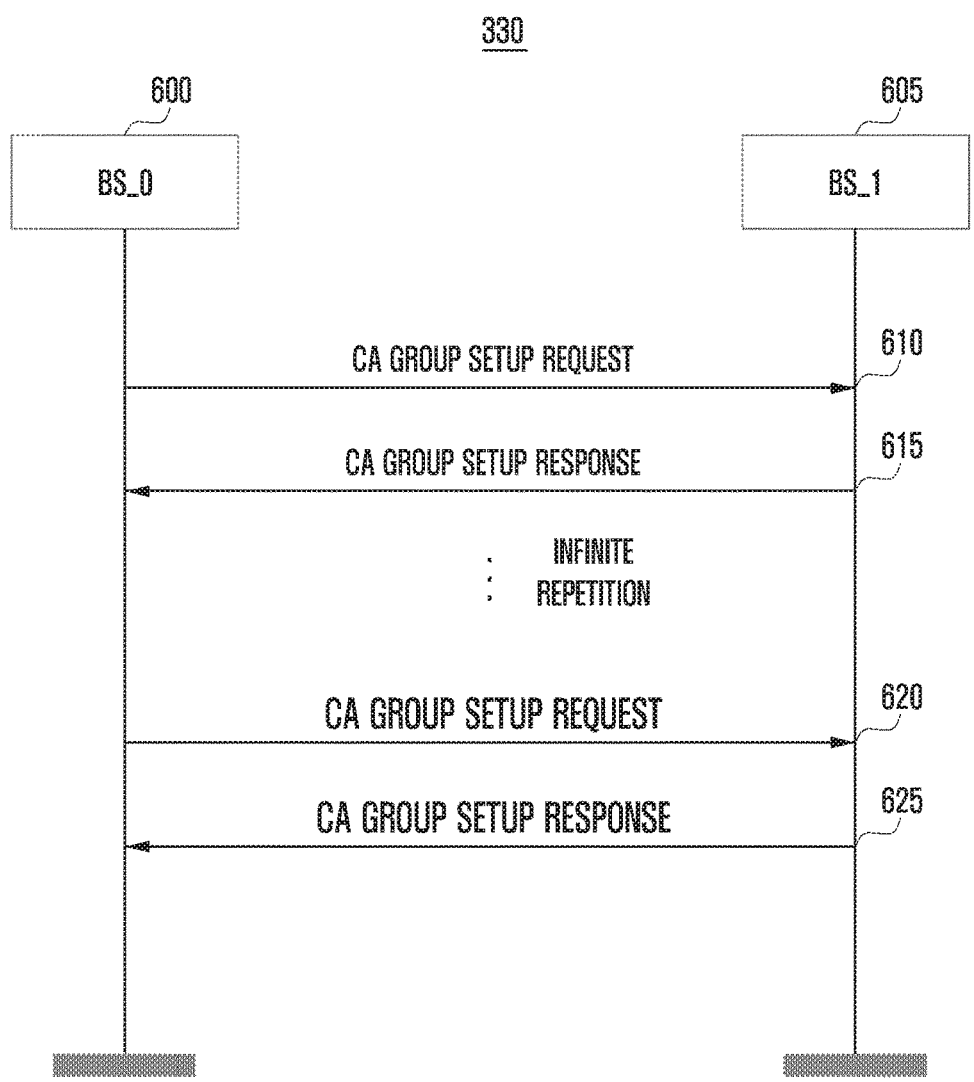
FIG. 6 is a diagram showing a method of setting up a carrier aggregation group according to an embodiment of the present invention.

FIG. 6 is a diagram showing a method of setting up (330) a CA group according to an embodiment of the present invention.

The operation for setting up a CA group according to an embodiment of the present invention may be performed in such a manner that a BS_0 600 sends a CA Group Setup Request message to a BS_1 605 at step 610 and the BS_1 605 sends a CA Group Setup Response message in response thereto at step 615. The BS_0 600 may repeatedly send the CA Group Setup Request message at step 620. In response thereto, the BS_1 605 may send the CA Group Setup Response message at step 625.

For example, the call processing block of the BS_0 600 may send the CA Group Setup Response message from the moment when the following condition is satisfied.

A. A state given from the K/A result of a counterpart BS shifts to the Enable state The BS_0 600 may send the CA Group Setup Request message, including SCell Usage, Band, PCID, EarfcnDL, Inter-BS Connection ID, Colocated SCell and ConfigCommon SCell information of its cells, to the BS_1 605 in a periodCAGroupSetup cycle, and may wait for the CA Group Setup Response message. The Colocated SCell may indicate a colocated SCell for the frequency of a counterpart BS of a cell having a corresponding cell number.

Furthermore, although the following conditions are triggered in the state in which a state given from the K/A result of the BS_1 605 maintains the Enable state, the BS_0 600 may send the CA Group Setup Response message.

B. A cell within a BS is extended or reduced

C. Completion of a PCID change within a BS

D. A ColocatedCell change within a BS: a change attributable to an operator input E. A ConfigCommon SCell change F. Cell barred, release, shutting down, or the release of a corresponding situation The BS_0 600 may send the CA Group Setup Request message, including SCell Usage, Band, PCID, EarfcnDL, Inter-BS Connection ID, Colocated SCell and ConfigCommon SCell List information of its cells, to the BS_1 605 in the periodCAGroupSetup cycle, and may wait for the CA Group Setup Response message.

When a CA Group Setup Request message is received from another BS (for example, the BS_0 600) within a CA group, if the aforementioned conditions A to D in which the Inter-BS Keep-Alive Request message is transmitted are satisfied and the matching of a correspondence relation between the colocated SCell of the received CA Group Setup Request message and a colocated SCell within its BS is checked, the call processing block of the BS_1 605 may incorporate SCell Usage, Band, PCID, EarfcnDL, Inter-BS Connection ID, Colocated SCell and ConfigCommon SCell information within the received CA Group Setup Request message into a system parameter, may include its own SCell Usage, Band, PCID, EarfcnDL, Inter-BS Connection ID, Colocated SCell and ConfigCommon SCell information in a CA Group Setup Response message, and may send the CA Group Setup Response message to the BS_0 600. Furthermore, the call processing block of the BS_1 605 sets bscaCommState of corresponding iNodeID to 1 indicative of the Enable state. bscaCommState is a parameter indicating the normality of a CA group connection. Meanwhile, if any one of the aforementioned conditions A to D in which the Inter-BS Keep-Alive Request message is transmitted is not satisfied, the BS_1 605 may ignore the received CA Group Setup Request message.

When the call processing block of the BS_0 600 receives a CA Group Setup Response message while waiting for a CA Group Setup Response message, it may incorporate SCell Usage, Band, PCID, EarfcnDL, Inter-BS Connection ID, Colocated SCell and ConfigCommon SCell information within the received message into a system parameter.

Figure 7:
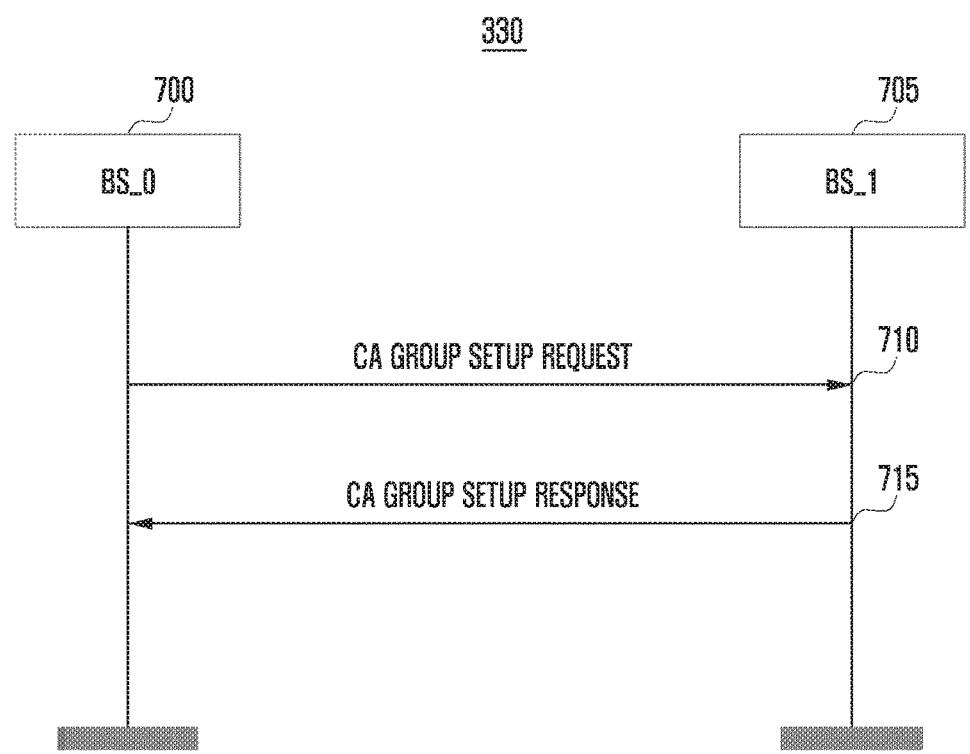
FIG. 7 is a diagram showing a failure of the setup of a carrier aggregation group according to an embodiment of the present invention.

FIG. 7 is a diagram showing a failure of the setup of a CA group according to an embodiment of the present invention.

In accordance with an embodiment of the present invention, at step 710, a BS_0 700 may send a CA Group Setup Request message to a BS_1 705. Thereafter, at step 715, the BS_0 700 may receive a CA Group Setup Failure message from the BS_1 705.

When the call processing block of the BS_0 700 receives a CA Group Setup Failure message while waiting for a CA Group Setup Response message, it may reset a system parameter in which SCell Usage, Band, PCID, EarfcnDL, Inter-BS Connection ID, Colocated SCell and ConfigCommon SCell information of the iNodeID of the BS_1 705 that has sent the message are maintained to a default value. Furthermore, the call processing block of the BS_0 700 sets bscaCommState of the corresponding iNodeID to 3 indicative of the Disable state attributable to other causes.

In accordance with various embodiments of the present invention, when a BS_0 does not receive a CA Group Setup Response message from a counterpart BS (for example, the BS_1) during a periodCAGroupSetup time after a CA Group Setup Request message is transmitted, it may continuously repeat the transmission of the CA Group Setup Request message and the waiting of the periodCAGroupSetup time up to caGroupSetupReptCount times. If the CA Group Setup Response message is not received during the continuous caGroupSetupReptCount times, that is, during a periodCAGroupSetup×caGroupSetupReptCount time, the BS_0 sets the bscaCommState of the counterpart BS to 2 indicative of the Disable state attributable to the non-reception of a response.

In accordance with various embodiments of the present invention, the call processing block of a BS_0 that has set up a CA group may release the CA group from the moment when any one of the following conditions is not satisfied after all the following conditions maintain the state in which they are satisfied with respect to a counterpart BS (for example, the BS_1) that maintains the setup of a CA group.

A. The state of a counterpart BS given from a K/A result is 'Enable'

B. A BS completes the preparation of CA support in a shape structure manner

C. The status of an inter-BS connection ID (iNodeID) is 'Equip'

For example, the BS_0 sets bscaCommState to 2 at the moment when any one of the conditions is satisfied. During a CA group setup process, the BS_0 may no longer send a CA Group Setup Request message to the counterpart BS.

In accordance with various embodiments of the present invention, when the bscaCommState of a counterpart BS of a BS (for example, the BS_0) in which a PCell is present shifts to 'Disable' (2 or 3), the cells of a BS (for example, the BS_1) in which an SCell is present may release the resources of a corresponding call by indicating SCell release in a MAC block in which the SCell calls of the PCell belonging to the corresponding BS are present.

Next, in relation to (B) the individual CA configuration/release/change/modification operation of an MS, in accordance with various embodiments of the present invention, the operation may be performed through the transmission and reception of SCell configuration messages between the call processing blocks of BSs. The SCell configuration message may include the identifiers of addition/release/change/modification depending on an SCell configuration type (ConfigType).

An embodiment in which an SCell configuration that belongs to SCell configurations according to various embodiments of the present invention and that is triggered from a BS in which a PCell is present to a BS in which an SCell is present may include a configuration related to SCell addition, SCell release, an SCell change, and SCell modification. An intra-BS CA may be a structure in which a call processing block delivers configuration information necessary to perform such a request to a MAC block on the SCell side. In contrast, an inter-eNB CA according to various embodiments of the present invention may be realized by exchanging messages including request information between the call processing blocks of BSs and delivering the messages to the MAC blocks of the BSs.

Figure 8:
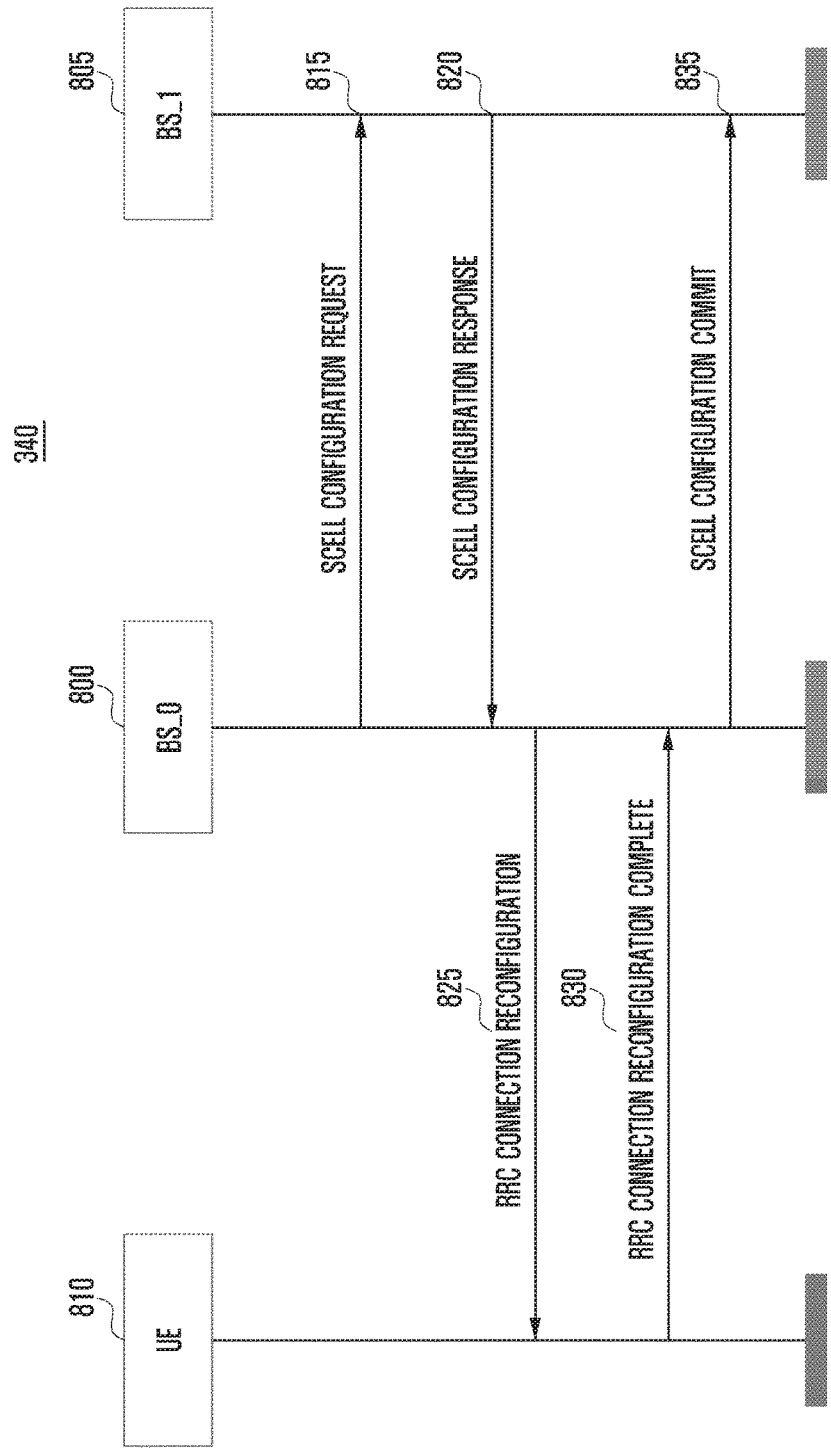
FIG. 8 is a diagram showing a method of connecting an SCell to a UE according to an embodiment of the present invention.

FIG. 8 is a diagram showing a method of connecting an SCell to a UE according to an embodiment of the present invention.

In accordance with the present embodiment, a BS (BS_0) 800 in which a PCell is present may trigger a configuration for adding an SCell to a UE with respect to a BS (BS_1) 805 in which an SCell is present.

At step 815, the BS_0 800 may send an SCell Configuration Request message to the BS_1 805. For example, if bscaCommState is 1 and SCellUsage mapped to a PCID is 'Use' in the BS_1 805 at a point of time at which a CA UE enters a cell (Attach, Idle to Active, HO) or at which a measurement report message for SCell addition is received (or in the case of a traffic-based CA, a traffic condition becomes 'Enable'), the call processing block of the BS_0 800 may set a message type in the BS_1 805 as 'SCell Addition' and send the SCell Configuration Request message including an SCell PCID. In this case, the BS_0 800 may send the SCell Configuration Request message only when all of conditions shown in Table 3 below and determined by the PCell are satisfied. Furthermore, the call processing block of the BS_0 800 may wait for an SCell Configuration Response message or an SCell Configuration Failure message.

TABLE 3

| PCell | | | |
|---|---|---|---|
| | 1 | CA flag ON | Whether CA ON/OFF flag is ON state |
| | 2 | CA Band Capability | Whether a UE supports a CA frequency supported by a BS |
| | 3 | Core Node No Restriction | Whether an agreed configuration called a CA-prohibited UE designated by an operator is not present |
| | 4 | Possible SCell Set | Whether a target SCell reported in a measurement report is a suitable SCell |
| | 5 | maxCACallCount Admit | Whether (an SCell Addition number set in a PCell) < a maximum number of service calls |

The call processing block of the BS_0 800 may increase the number of SCell configuration UEs of a corresponding SCell of the PCell by one right after sending the SCell Configuration Request message. If an SCell Configuration Response message or an SCell Configuration Failure message is not received during presetsCellConfigRespWaitTime, the BS_0 800 may return to the original state by decreasing the number of SCell configuration UEs by one. If this operation is an operation triggered by the reception of a measurement report message for SCell addition, the BS_0 800 may not send an RRC Connection Reconfiguration message. If this operation is an operation triggered by a chance other than the reception of a measurement report message for SCell addition, the BS_0 800 may send an RRC Connection Reconfiguration message not including SCell addition configuration to a UE. In this case, the BS_0 800 may not release a measurement configuration for SCell addition.

At step 820, the BS_1 805 that has received the SCell Configuration Request message may send an SCell Configuration Response message. When the SCell Configuration Request message whose message type is 'SCell Addition' is received, the BS_1 805 may send the SCell Configuration Response message whose message type is 'SCell Addition' to the BS_0 800. In this case, when only all of the conditions shown in Table 4 and determined by the SCell are satisfied, the BS_1 805 may send the SCell Configuration Response message. Furthermore, the BS_1 805 may increase the number of SCell configuration UEs by one simultaneously with the transmission of the SCell Configuration Response message and may wait for an SCell Configuration Commit message during preset sCellConfigCommitWaitTime. If the SCell Configuration Commit message is not received until the sCellConfigCommitWaitTime expires, the BS_1 805 may decrease the number of SCell configuration UEs. After the sCellConfigCommitWaitTime expires, the received SCell Configuration Response message may be ignored.

When the SCell Configuration Request message whose message type is 'SCell Addition' is received, if a cell included in the received message does not satisfy any one of the conditions determined by an SCell of Table 4, the BS_1 905 may send the SCell Configuration Failure message to the BS_0 900. In this case, the BS_1 905 may enclose the unsatisfied condition of the conditions determined by the SCell in the SCell Configuration Failure message as a failure cause. Furthermore, if SCellUsage has been set as 'Not use', the BS_1 905 may send the SCell Configuration Failure message in which SCellUsage set as 'Not use' is a failure cause.

When the SCell Configuration Failure message whose message type is 'SCell Addition' is received before preset sCellConfigRespWaitTime expires, the BS_0 900 stops a waiting operation and does not perform an SCell addition operation. That is, the BS_0 900 does not send an RRC Connection Reconfiguration message including an 'SCell Addition' configuration to a UE and does not internally perform the allocation of resources for a CA on the MAC of a PCell. After the sCellConfigRespWaitTime expires, when the SCell Configuration Failure message is received, the BS_0 900 may ignore the received message. Furthermore, the BS_0 900 may restore the number of SCell configuration

TABLE 4

| SCell | 1 | CA-CAC Cell Admit | Whether (# of UEs as PCell) + (# of UEs as SCell) < (max # of UE) of a cell is satisfied |
|---|---|---|---|
| | 2 | Cell Not Shutting down | Whether a cell is not a shutting down state for transition to a cell release state |
| | 3 | Cell Not barred | Whether a cell is not a barred state by a BS processing load and an operator input |
| | 4 | Cell Not Reserved | Whether a cell is not a cell reserved state by an operator input |
| | 5 | Cell Not Released | Whether a cell is not a release state by an obstacle or lock |

At step 825, when the SCell Configuration Response message is received within sCellConfigRespWaitTime after sending the SCell Configuration Request message whose message type is 'SCell Addition', the BS_0 800 may send an RRC Connection Reconfiguration message, including an SCell addition configuration, to the UE 810. Thereafter, at step 830, the BS_0 800 may receive an RRC Connection Reconfiguration Complete message from the UE 810. Thereafter, at step 835, the BS_0 800 may send an SCell Configuration Commit message which includes MAC/PHY configuration information of the PCell and the SCell and whose SCell configuration type (ConfigType) has been set as 'Addition' to the BS_1 805. In accordance with an embodiment of the present invention, the information transferred through the SCell Configuration Commit message may be the same as information transferred in the case of an inter-eNB CA. When the SCell Configuration Commit message whose SCell configuration type (ConfigType) has been set as 'Addition' is received, the call processing block of the BS_1 805 may transfer the received MAC/PHY configuration information of the PCell and the SCell to a DSP in which the SCell to be added is present, for example.

Figure 9:
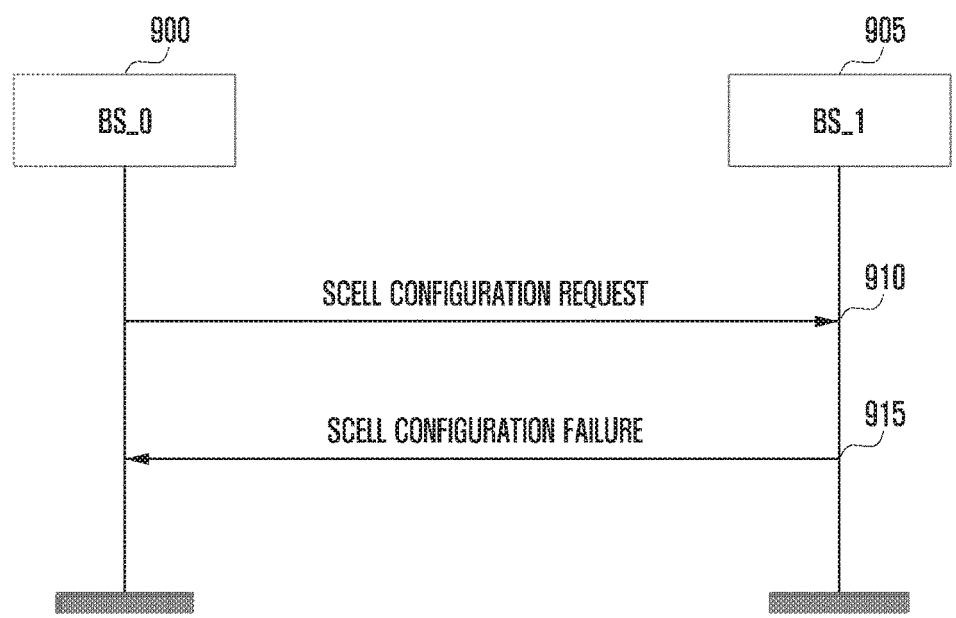
FIG. 9 is a diagram showing a failure of the connection of an SCell to a UE according to an embodiment of the present invention.

FIG. 9 is a diagram showing a failure of the connection of an SCell to a UE according to an embodiment of the present invention.

In accordance with an embodiment of the present invention, at step 910, a BS_0 900 may send an SCell Configuration Request message to a BS_1 905. Thereafter, at step 915, the BS_0 900 may receive an SCell Configuration Failure message from the BS_1 905.

UEs of a corresponding SCell to its original state right after the SCell Configuration Failure message is received.

Figure 10:
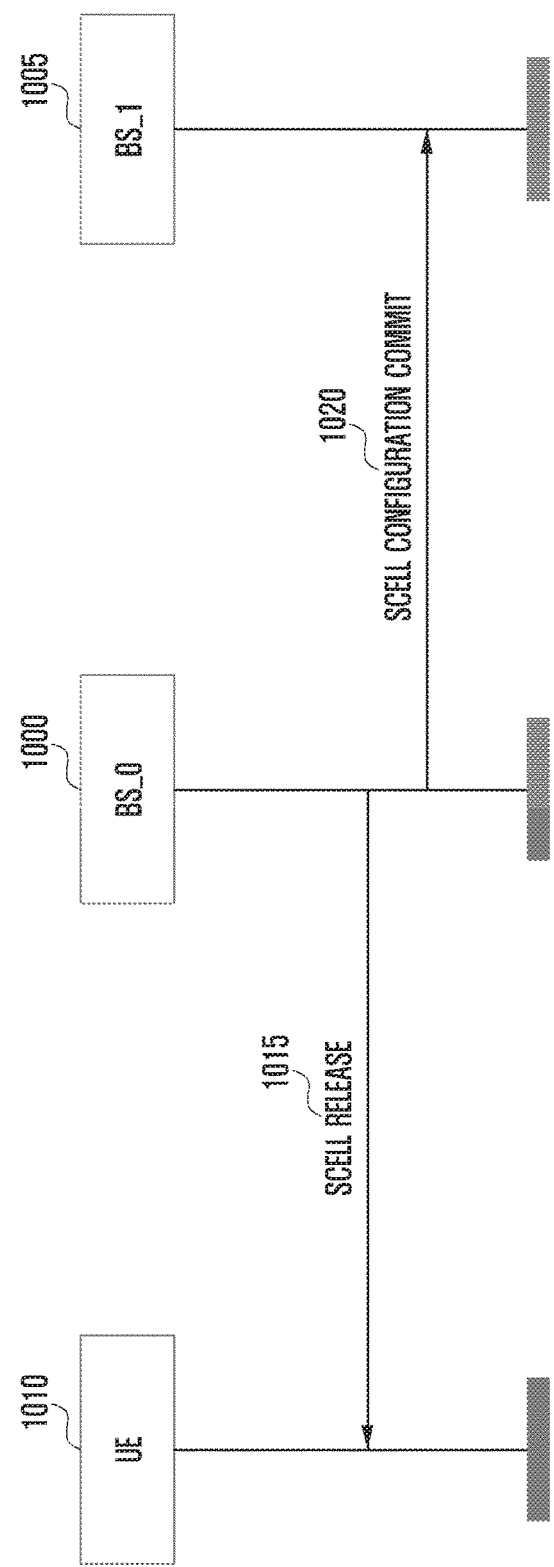
FIG. 10 is a diagram showing a method of releasing an SCell connected to a UE according to an embodiment of the present invention.

FIG. 10 is a diagram showing a method of releasing an SCell connected to a UE according to an embodiment of the present invention.

In accordance with the present embodiment, a BS (BS_0) 1000 in which a PCell is present may trigger a configuration for releasing an SCell connected to a UE with respect to a BS (BS_1) 1005 in which the SCell is present.

At step 1015, at a point of time of the cell drain (call release/delete, HO out) of a UE 1010 or when a measurement report message for SCell release is received (or in the case of a traffic-based CA, a traffic condition becomes 'Disable'), the call processing block of the BS_0 1000 may send an SCell Release Configuration Indication (SCell Release) message to the UE 1010. The BS_0 1000 may decrease the number of SCell configuration UEs of the corresponding SCell by one.

At step 1020, if the bscaCommState of a BS in which the SCell to be released is present, that is, the BS_1 1005, is 1, the BS_0 1000 may send an SCell Configuration Commit message whose SCell configuration type (ConfigType) is 'SCell Release' to the call processing block of the BS_1 1005 in addition to the DSP of the PCell. In accordance with an embodiment of the present invention, the information transferred through the SCell Configuration Commit message may be the same as information transferred in the case of an intra-eNB CA. When the SCell Configuration Commit message whose SCell configuration type has been set as 'SCell Release' is received, the call processing block of the BS_1 1005 may transfer the received MAC/PHY configuration information of the PCell and SCell to a DSP in which the SCell to be released is present without any change, and may decrease the number of SCell configuration UEs that have been added by one. Meanwhile, in accordance with various embodiments of the present invention, if the BS_1 1005 has not once received the SCell Configuration Commit message whose SCell configuration type (ConfigType) is 'SCell Release', the BS_1 1005 may control the present resources so that they can be recovered.

Figure 11:
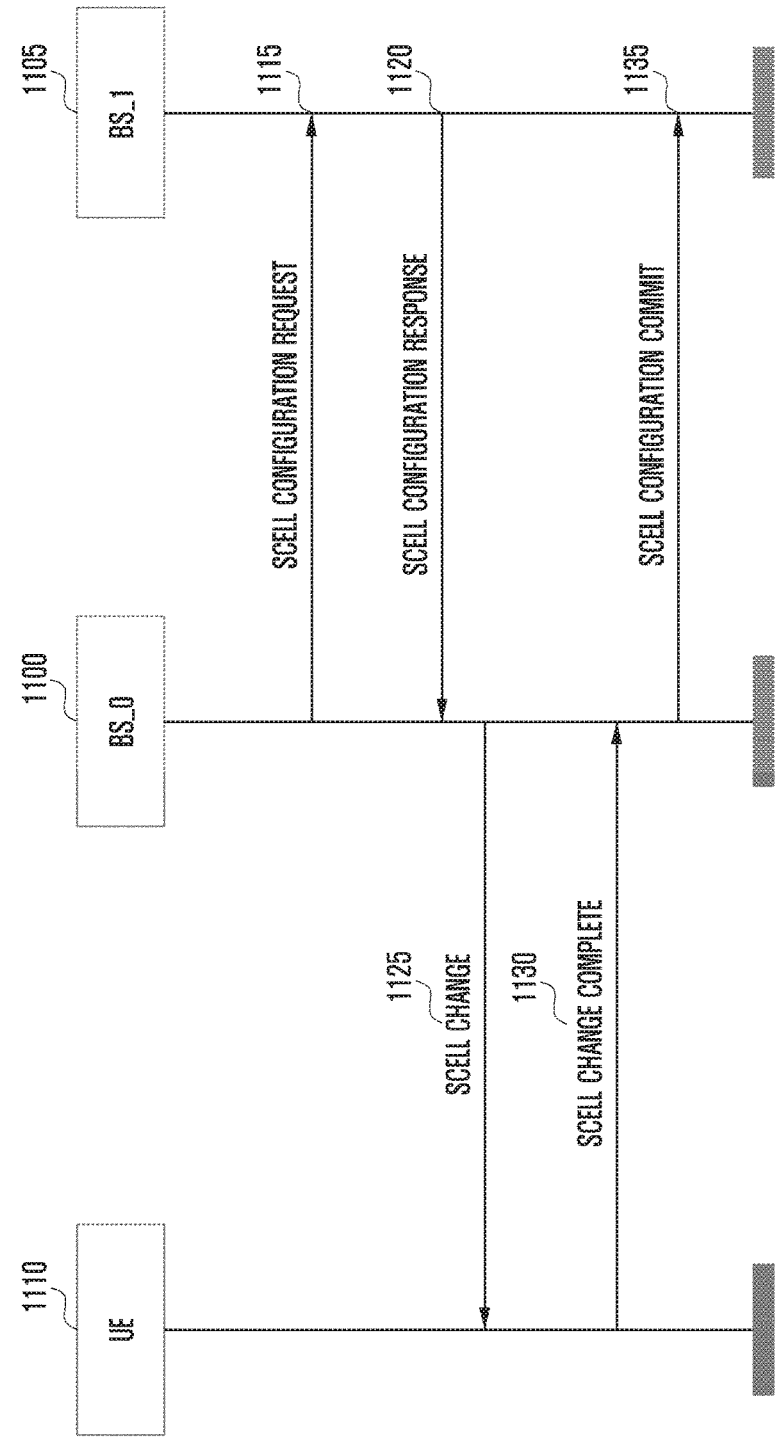
FIG. 11 is a diagram showing a method of changing an SCell connected to a UE according to an embodiment of the present invention.

FIG. 11 is a diagram showing a method of changing an SCell connected to a UE according to an embodiment of the present invention.

In accordance with the present embodiment, a BS (BS_0) 1100 in which a PCell is present may trigger a configuration for changing an SCell to a UE with respect to a BS (BS_1) 1105 in which the SCell is present.

At step 1115, if bscaCommState is 1, the SCell to be changed and added satisfies the fourth condition of the conditions determined by the PCell in Table 3, and SCellUsage mapped to the PCID of the cell to be changed and added in the BS_1 1105 is 'Use' at a point of time at which a measurement report for SCell change is received, the call processing block of the BS_0 1100 may send an SCell Configuration Request message whose message type is 'SCell Change' and which includes an SCell PCID to be changed and added and an SCell PCID to be released to the BS_1 1105. After sending the SCell Configuration Request message, the call processing block of the BS_0 1100 may increase the number of SCell configuration UEs of the SCell to be changed and added by one and wait for an SCell Configuration Response message or an SCell Configuration Failure message from the BS_1 1105. If there is no response message during preset sCellConfigRespWaitTime, the BS_0 1100 does not indicate an SCell change configuration for a UE 1110 and may restore the number of SCell configuration UEs to its original state.

At step 1120, when an SCell Configuration Request message whose message type is 'SCell Change' is received, if the cell of the PCID that is included in the message and that is to be changed and added satisfies all of the conditions determined by the SCell in Table 4, the BS_1 1105 may return an SCell Configuration Response message whose message type is 'SCell Change' to the BS_0 1100. The BS_1 1105 may increase the number of SCell configuration UEs simultaneously with the transmission of the SCell Configuration Response message and wait for an SCell Configuration Commit message during preset sCellConfigCommitWaitTime. If an SCell Configuration Commit message is not received until the sCellConfigCommitWaitTime expires, the BS_1 1105 may decrease the number of SCell configuration UEs again. The BS_1 1105 may ignore an SCell Configuration Commit message received after the sCellConfigCommitWaitTime expires.

At step 1125, when the SCell Configuration Response message is received within the preset sCellConfigRespWaitTime after the SCell Configuration Request message whose message type is 'SCell Change' is transmitted, the BS_0 1100 may send an SCell Change Configuration Indication (SCell Change) message to the UE 1110. Thereafter, at step 1130, the BS_0 1100 may receive an SCell Change Configuration Complete (SCell Change Complete) message indicating that the SCell change configuration has been completed from the UE 1110. Thereafter, at step 1135, the BS_0 1100 may send an SCell Configuration Commit message which includes MAC/PHY configuration information of the PCell and the two SCells and whose SCell configuration type (ConfigType) has been set as 'Change' to the BS_1 1105 in addition to the DSP of the PCell. In accordance with an embodiment of the present invention, the information transferred through the SCell Configuration Commit message may be the same as information in the case of an intra-eNB CA. The BS_0 1100 may decrease the number of SCell configuration UEs of the SCell that is released in response to a change by one. When the SCell Configuration Commit message whose SCell configuration type has been set as 'Change' is received, the call processing block of the BS_1 1105 may transfer the received MAC/PHY configuration information of the PCell and the SCell to the DSP in which the SCell to be released is present and also transfer the received MAC/PHY configuration information of the PCell and the SCell to the DSP in which the SCell to be changed and added is present. Furthermore, the BS_1 1105 may decrease the number of SCell configuration UEs of the SCell to be released.

Figure 12:
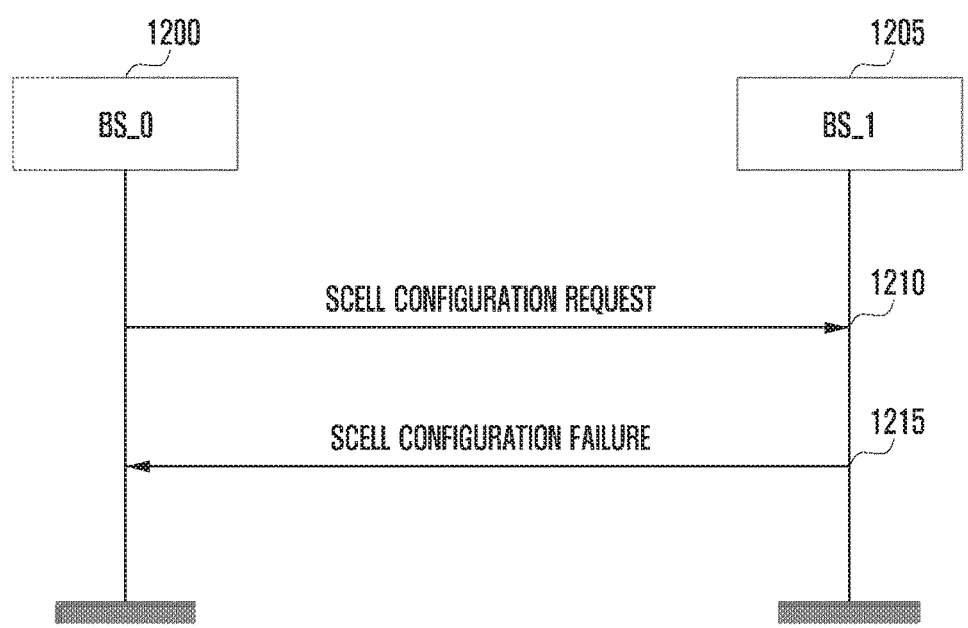
FIG. 12 is a diagram showing a failure of the change of an SCell connected to a UE according to an embodiment of the present invention.

FIG. 12 is a diagram showing a failure of the change of an SCell connected to a UE according to an embodiment of the present invention.

In accordance with an embodiment of the present invention, at step 1210, a BS_0 1200 may send an SCell Configuration Request message to a BS_1 1205. Thereafter, at step 1215, the BS_0 1200 may receive an SCell Configuration Failure message from the BS_1 1205.

When the BS_1 1205 receives the SCell Configuration Request message whose message type is 'SCell Change', if the cell of a PCID that is included in the received message and that is to be changed and added does not satisfy any one of the conditions determined by an SCell in Table 4, the BS_1 1205 may send the SCell Configuration Failure message whose message type is 'SCell Change' to the BS_0 1200. In this case, the BS_1 1205 may enclose the unsatisfied condition of the conditions determined by the SCell in the SCell Configuration Failure message as a failure cause. Furthermore, if SCellUsage has been set as 'Not use', the BS_1 1205 may send the SCell Configuration Failure message including SCellUsage set as 'Not use' as a failure cause.

When the SCell Configuration Failure message whose message type is 'SCell Change' is received before preset sCellConfigRespWaitTime expires, the BS_0 1200 may stop a waiting operation and may not perform an SCell change. That is, the BS_0 1200 may not indicate SCell addition and release according to a cell change for a UE and may also do not perform the allocation of a resource change to internal MAC. When the SCell Configuration Failure message is received after the sCellConfigRespWaitTime expires, the BS_0 1200 may ignore the received message. Furthermore, the BS_0 1200 may restore the number of SCell configuration UEs of the SCell to be added to its original state.

Figure 13:
FIG. 13 is a diagram showing a method of modifying the configuration of an SCell connected to a UE according to an embodiment of the present invention.

FIG. 13 is a diagram showing a method of modifying the configuration of an SCell connected to a UE according to an embodiment of the present invention.

In accordance with the present embodiment, a BS (BS_0) 1300 in which a PCell is present may trigger a configuration for modifying the configuration of an SCell connected to a UE with respect to a BS (BS_1) 1305 in which the SCell is present.

At step 1310, if bscaCommState is 1 and it is necessary to notify the call processing block of the BS_1 1305 of SCell configuration modification, the call processing block of the BS_0 1300 may send an SCell Configuration Commit message whose message type is 'SCell Modification'. When an S1AP E-RAB Setup Request, S1AP E-RAB Modify Request or S1AP E-RAB Modify Request is received from MME, for example, the BS_0 1300 may receive a response message indicating that a corresponding configuration has been completed from the UE, and may send the SCell Configuration Commit message, including MAC/PHY configuration information of the PCell and the SCell, to the BS_1 1305 in addition to the MAC of the PCell. In accordance with an embodiment of the present invention, the information transferred through the SCell Configuration Commit message may be the same as information in the case of an intra-eNB CA.

When the SCell Configuration Commit message whose SCell configuration type (ConfigType) has been set as 'Modification' is received, the call processing block of the BS_1 1305 may extract an internal configuration message including the MAC/PHY configuration information of the PCell and the SCell within the received message and send the extracted internal configuration message to MAC in which the SCell on which modification is to be performed is present.

An embodiment in which a BS having an SCell present therein triggers an SCell configuration with respect to a BS in which the PCell of a corresponding UE is present in the SCell configuration according to various embodiments of the present invention may include a configuration related to SCell release with call admission control (CAC) of the SCell as a momentum.

Figure 14:
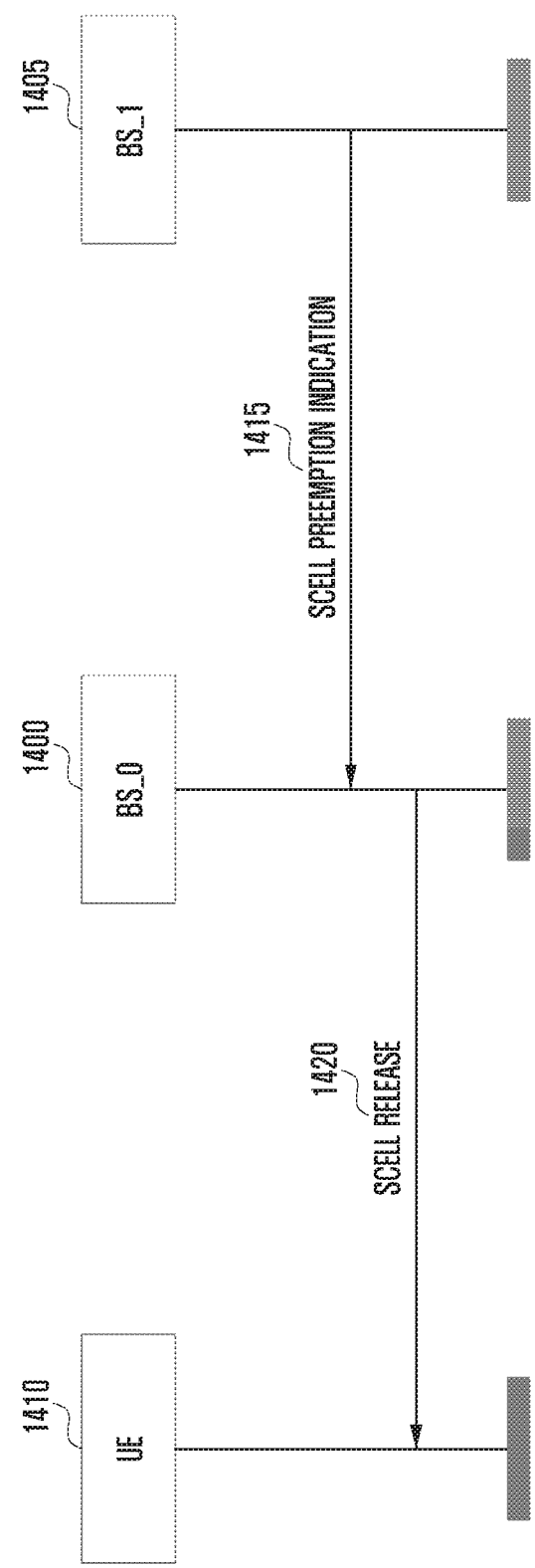
FIG. 14 is a diagram showing a method of releasing an SCell connected to a UE according to an embodiment of the present invention.

FIG. 14 is a diagram showing a method of releasing an SCell connected to a UE by the cell preemption of the SCell according to an embodiment of the present invention.

In accordance with the present embodiment, a BS (BS_1) 1405 in which an SCell is present may trigger a BS (BS_0) 1400 in which a PCell is present so that the BS_0 1400 releases the SCell.

If the sum of the number of SCell UEs and the number of PCell UEs in a serving cell is the same as a maximum number of UEs that may be accommodated and when a new UE requests an RRC connection from the cell, the call processing block of the BS_1 1405 accepts the access of the new UE and needs to release one of UEs that are being served through the SCell. Accordingly, at step 1415, the call processing block of the BS_1 1405 may send an SCell Preemption Indication message, including information about a UE 1410 to be released, to the BS_0 1400 in which the PCell of the UE 1410 connected to the SCell to be released is present. The BS_1 1405 may decrease the number of SCell configuration UEs by one and also transfer the release information to a DSP in which the SCell is present.

When the SCell Preemption Indication message is received, the call processing block of the BS_0 1400 may send an SCell Release Indication (SCell Release) message to the UE 1410 designated within the received message at step 1420. Furthermore, the BS_0 1400 may also transfer the SCell release information to the MAC of the PCell and decrease the number of SCell configuration UEs of the corresponding SCell.

Table 5 below shows an example of parameters set in the call processing blocks of BSs (for example, the BS_0 and the BS_1) for constructing a multi-cell network according to various embodiments of the present invention.

TABLE 5

| Object name | Parameter name | Description |
|---|---|---|
| Shared information within CA Group | iNodeID | It is the index of an inter-connection node allocated within a BS Group capable of a CA. In this case, each BS may be configured into a cell capable of an inter-eNB CA. |
| | BScaUsage | It is the Inactive/Active setting of a BS corresponding to iNodeID within a CA Group. It may be changed by the setting of an operator. In the case of Inactive, a CA operation and audit operation with the call processing block of a corresponding BS are impossible. 0: Inactive 1: Active |
| | BScaCommState | It is a parameter indicative of the normality of a CA Group connection and parameter for operator query and is Read Only. An initial state is 0, 1 if a CA Group configuration is normally performed, and 2 if there is no normal response of a counterpart BS. 0: Unknown 1: Enable 2: Disable (No response) 3: Disable (etc) |
| Common information within CA Group | caGroupCommID | It is a null index for representing the attributes of BSs within a CA Group |
| | periodCaGroupSetup | It is a time interval when an inter-eNB CA Group Setup Request message within a CA group is repeatedly transmitted. |
| | caGroupSetupRept Count | It is the number of times that a Communication Failure state is entered because a case where an inter-eNB CA Group Setup Request message within a CA group is transmitted and a CA Group Setup Response is not received is continuously generated. |
| | sCellConfigResp WaitTime | It is a waiting time until an SCell Configuration Response message is received after an SCell Configuration Request message is transmitted. If an SCell Configuration Response message is not received until the timer expires, SCell Addition/Change/Modification is not performed. |
| | sCellConfigCommit WaitTime | It is a waiting time until an SCell Configuration Commit message is received after an SCell Configuration Response message is transmitted. If an SCell Configuration Commit message is not received until the timer expires, the number of UEs is restored to its original state upon performing SCell Addition. |

Figure 15:
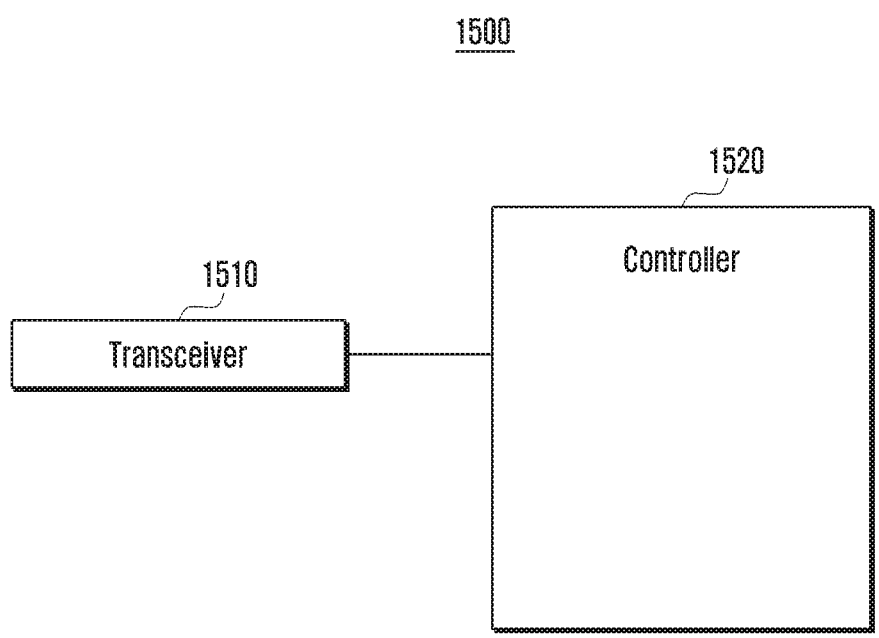
FIG. 15 is a diagram showing a first BS apparatus according to an embodiment of the present invention.

FIG. 15 is a diagram showing a first BS (for example, the BS_0) apparatus 1500 which supports a first cell connected to a UE according to an embodiment of the present invention.

The first BS apparatus 1500 according to an embodiment of the present invention may include a transceiver 1510 and a controller 1520. The transceiver 1510 may send and/or receive a signal to and/or from at least one network node. The controller 1520 may include a call processing block and control the execution of an operation for constructing a multi-cell network according to an embodiment of the present invention.

In accordance with an embodiment of the present invention, the controller 1520 may perform control so that a group including first and second cells is set up with a second BS apparatus supporting the second cell through a first interface (for example, a higher layer interface) and a configuration for additionally connecting the second cell to a UE is negotiated with the second BS apparatus through the first interface. The first interface may connect the RRC/RRM processing controllers of the first BS apparatus and second BS apparatus directly, for example.

Furthermore, after negotiating with the second BS apparatus, the controller 1520 sends a configuration message including configuration information for additionally connecting the second cell to the UE. When a response message for the configuration message is received from the UE, the controller 1520 may perform control so that a second cell addition configuration complete message to the second BS apparatus through the first interface.

Furthermore, the controller 1520 may perform control so that a keep-alive request message is transmitted to the second BS apparatus through the first interface in a specific cycle before a group is set up, a response message for the keep-alive request is monitored, and group setup is performed when the response message for the keep-alive request message is received.

Furthermore, the controller 1520 may perform control so that a group setup request message including the first and the second cells is transmitted to the second BS apparatus through the first interface for group setup and a response message for the group setup request message is received from the second BS apparatus through the first interface. The group setup request message may include information related to the first cell and information related to the first BS apparatus. The response message for the group setup request message may include information related to the second cell and information related to the second BS apparatus.

Furthermore, when the response message for the group setup request message is received, for a negotiation, the controller 1520 may perform control so that a second cell addition configuration request message is transmitted to the second BS apparatus through the first interface and a response message for the second cell addition configuration request message is received from the second BS apparatus through the first interface.

Furthermore, after the second cell is additionally connected to the UE, the controller 1520 may perform control so that a release configuration indication message for the second cell is transmitted to the UE, a second cell release configuration message is transmitted to the second BS apparatus through the first interface or a request message for changing the second cell connected to the UE to a third cell is transmitted to the second BS apparatus through the first interface, and a cell change indication message is transmitted to the UE when a response message for the request message is received from the second BS apparatus through the first interface or a release configuration indication message for the second cell is transmitted to the UE when a preemption indication message for the second cell is received from the second BS apparatus.

Figure 16:
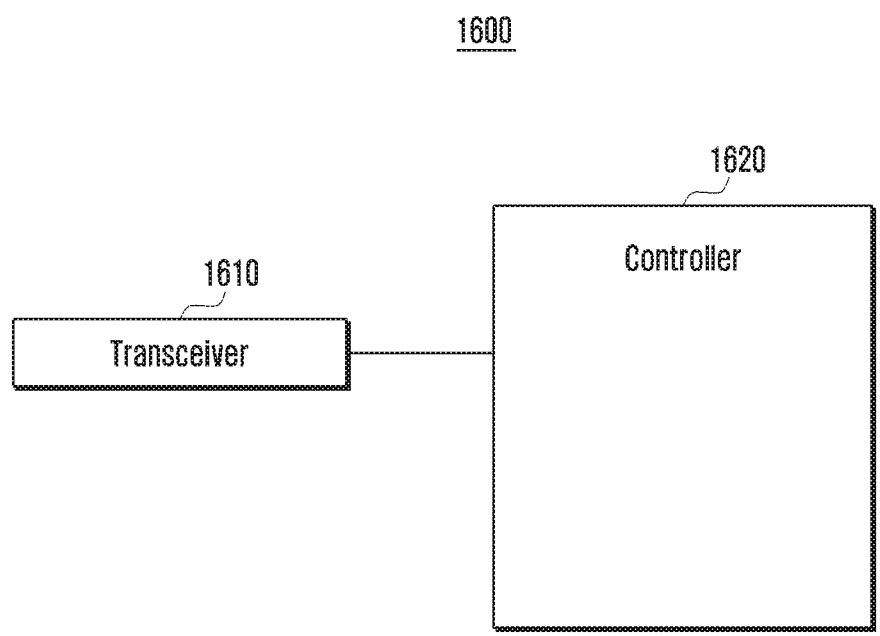
FIG. 16 is a diagram showing a second BS apparatus according to an embodiment of the present invention.

FIG. 16 is a diagram showing a second BS (for example, the BS_1) apparatus 1600 which supports a second cell according to an embodiment of the present invention.

The second BS apparatus 1600 according to an embodiment of the present invention may include a transceiver 1610 and a controller 1620. The transceiver 1610 may send and/or receive a signal to and/or from at least one network node. The controller 1620 may include a call processing block and control the execution of an operation for constructing a multi-cell network according to an embodiment of the present invention.

In accordance with an embodiment of the present invention, the controller 1620 may perform control so that a group including first and second cells is set up with a first BS apparatus connected to the UE through the first cell through a first interface and a configuration for additionally connecting the second cell to the UE is negotiated with the first BS apparatus through the first interface.

Figure 17:
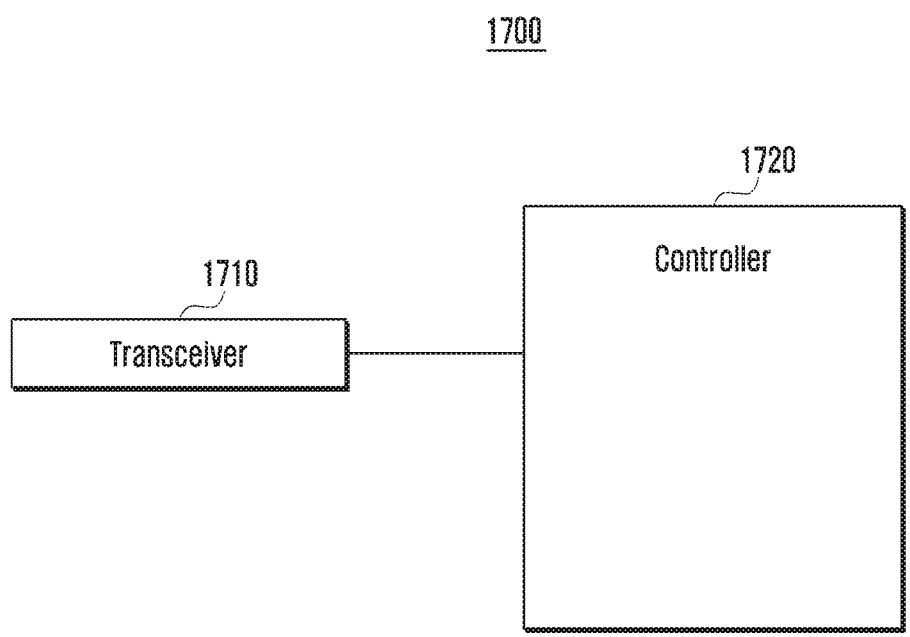
FIG. 17 is a diagram showing a UE apparatus according to an embodiment of the present invention.

FIG. 17 is a diagram showing a UE apparatus 1700 according to an embodiment of the present invention.

The UE apparatus 1700 according to an embodiment of the present invention may include a transceiver 1710 and a controller 1720. The transceiver 1710 may send and/or receive a signal to and/or from at least one network node. The controller 1720 may control the execution of a multi-cell connection operation according to an embodiment of the present invention.

In accordance with an embodiment of the present invention, the controller 1720 may perform control so that after a group including first and second cells is set up through a first interface which connects the first cell of a first BS apparatus and connects the first and the second BS apparatuses, a configuration message for additionally connecting the second cell is received from the first BS apparatus.

The embodiments of the present disclosure disclosed in the present specification and drawings are illustrated to present only specific examples in order to clarify the technological contents of the present disclosure and help understanding of the present disclosure, but are not intended to limit the scope of the present disclosure. Accordingly, the scope of the present disclosure should be construed as including all of changes or modified forms derived based on the technological spirit of the present disclosure in addition to the disclosed embodiments.

The invention claimed is:

1. A method by a first base station supporting a first cell to construct a multi-cell network with a second base station supporting a second cell, the method comprising:
   setting up a cell group for carrier aggregation with the second base station through a first interface; and
   performing a configuration with the second base station through the first interface for additionally connecting the second cell to a user equipment, the second cell being included in the cell group for carrier aggregation.

2. The method of claim 1,
   wherein the first interface connects RRC/RRM processing controllers of the first base station and the second base station, and
   wherein a second interface through which packet data is transmitted and received connects RLC/MAC processing controllers of the first base station and the second base station.

3. The method of claim 1, further comprising:
- transmitting a configuration message including configuration information for additionally connecting the second cell to the user equipment after the performing the configuration; and
- transmitting a second cell addition configuration commit message to the second base station through the first interface in response to receiving a response message for the configuration message from the user equipment.

4. The method of claim 3, further comprising at least one of:
- after the second cell is additionally connected to the user equipment, transmitting a release configuration indication message for the second cell to the user equipment and transmitting a second cell release configuration message to the second base station through the first interface;
- transmitting a request message changing the second cell connected to the user equipment to a third cell to the second base station through the first interface and transmitting a cell change indication message to the user equipment in response to receiving a response message for the request message from the second base station through the first interface; and
- transmitting a release configuration indication message for the second cell to the user equipment in response to receiving a preemption indication message for the second cell from the second base station.

5. The method of claim 1, further comprising:
- transmitting a keep-alive request message to the second base station through the first interface in a specific cycle prior to setting up the cell group and monitoring a response message for the keep-alive request,
- wherein the setting up the cell group is performed in response to receiving the response message for the keep-alive request message.

6. The method of claim 1, wherein the setting up the cell group comprises:
- transmitting a group setup request message including the first and the second cells to the second base station through the first interface; and
- receiving a response message for the group setup request message from the second base station through the first interface,
- wherein the group setup request message includes related information of the first cell and related information of the first base station, and
- wherein the response message for the group setup request message includes related information of the second cell and related information of the second base station.

7. The method of claim 6, wherein the performing the configuration comprises:
- transmitting a second cell addition configuration request message to the second base station through the first interface in response to receiving the response message for the group setup request message; and
- receiving a response message for the second cell addition configuration request message from the second base station through the first interface.

8. A first base station supporting a first cell, the first base station comprising:
- a transceiver configured to send and receive signals; and
- a controller configured to control to:
  - set up a cell group for carrier aggregation with a second base station supporting the second cell through a first interface, and
  - perform a configuration with the second base station through the first interface for additionally connecting the second cell to a user equipment, the second cell being included in the cell group for carrier aggregation.

9. The first base station of claim 8,
- wherein the first interface connects RRC/RRM processing controllers of the first base station and the second base station, and
- wherein a second interface through which packet data is transmitted and received connects RLC/MAC processing controllers of the first base station and the second base station.

10. The first base station of claim 8, wherein the controller is further configured to control to:
- transmit, after the performing the configuration, a configuration message including configuration information for additionally connecting the second cell to the user equipment, and
- transmit a second cell addition configuration commit message to the second base station through the first interface in response to receiving a response message for the configuration message from the user equipment.

11. The first base station of claim 10, wherein the controller is further configured to control to:
- after the second cell is additionally connected to the user equipment, transmit a release configuration indication message for the second cell to the user equipment and transmit a second cell release configuration message to the second base station through the first interface,
- transmit a request message changing the second cell connected to the user equipment to a third cell to the second base station through the first interface and transmit a cell change indication message to the user equipment in response to receiving a response message for the request message from the second base station through the first interface, and/or
- transmit a release configuration indication message for the second cell to the user equipment in response to receiving a preemption indication message for the second cell from the second base station.

12. The first base station of claim 8, wherein the controller is further configured to control to:
- transmit a keep-alive request message to the second base station through the first interface in a specific cycle prior to setting up the cell group, and monitor a response message for the keep-alive request,
- wherein the controller is configured to set up the cell group in response to receiving the response message for the keep-alive request message.

13. The first base station of claim 8,
- wherein the controller is configured to control to:
  - transmit a group setup request message including the first and the second cell is transmitted to the second base station through the first interface for the setting up the cell group, and
  - receive a response message for the group setup request message from the second base station through the first interface,
- wherein the group setup request message includes related information of the first cell and related information of the first base station, and
- wherein the response message for the group setup request message includes related information of the second cell and related information of the second base station.

14. The first base station of claim 13, wherein the controller is configured to control to:

transmit, in response to receiving the response message for the group setup request message, a second cell addition configuration request message to the second base station through the first interface, and receive a response message for the second cell addition configuration request message from the second base station through the first interface.

15. A method for a second base station supporting a second cell to construct a multi-cell network with a first base station supporting a first cell, the method comprising:

setting up a cell group for carrier aggregation with the first base station through a first interface; and performing a configuration with the first base station through the first interface for additionally connecting the second cell to the user equipment, the second cell being included in the cell group for carrier aggregation.

16. The method of claim 15, wherein the first interface connects RRC/RRM processing controllers of the second base station and the first base station.

17. A second base station supporting a second cell, the base station comprising:

a transceiver configured to send and receive signals; and a controller configured to control to:

set up a cell group for carrier aggregation with a first base station supporting a first cell through a first interface, and perform a configuration with the first base station through the first interface for additionally connecting the second cell to the user equipment, the second cell being included in the cell group for carrier aggregation.

18. The second base station of claim 17, wherein the first interface connects RRC/RRM processing controllers of the second base station and the first base station.

* * * * *